(12) United States Patent
Noh et al.

(10) Patent No.: US 11,564,243 B2
(45) Date of Patent: Jan. 24, 2023

(54) SIGNALING METHOD FOR MULTIPLEXING DIFFERENT AMENDMENT DEVICES IN AN ENHANCED WIRELESS LOCAL AREA NETWORK

(71) Applicant: NEWRACOM, Inc., Lake Forest, CA (US)

(72) Inventors: Yujin Noh, Lake Forest, CA (US); Heejung Yu, Daegu (KR); Jong-ee Oh, Lake Forest, CA (US); Jaeyoung Ryu, Lake Forest, CA (US)

(73) Assignee: NEWRACOM, Inc., Lake Forest, CA (US)

( * ) Notice: Subject to any disclaimer, the term of this patent is extended or adjusted under 35 U.S.C. 154(b) by 108 days.

(21) Appl. No.: 17/222,827

(22) Filed: Apr. 5, 2021

(65) Prior Publication Data

US 2022/0030604 A1    Jan. 27, 2022

Related U.S. Application Data

(60) Provisional application No. 63/110,291, filed on Nov. 5, 2020, provisional application No. 63/105,675, filed
(Continued)

(51) Int. Cl.
*H04W 72/12* (2009.01)
*H04W 72/04* (2009.01)

(52) U.S. Cl.
CPC ....... *H04W 72/1268* (2013.01); *H04W 72/04* (2013.01)

(58) Field of Classification Search
None
See application file for complete search history.

(56) References Cited

U.S. PATENT DOCUMENTS

2016/0128057 A1* 5/2016 Seok ................. H04L 1/0045
370/329
2016/0227537 A1* 8/2016 Li ........................ H04L 5/00
(Continued)

FOREIGN PATENT DOCUMENTS

CN          106535334 A     * 3/2017

OTHER PUBLICATIONS

IEEE 802.11—2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.
(Continued)

*Primary Examiner* — Kenny S Lin
(74) *Attorney, Agent, or Firm* — Nicholson, De Vos, Webster & Elliott, LLP

(57) ABSTRACT

A method is described for communicating in a network. The method includes setting a type bit in a frame to indicate whether the frame is scheduling an uplink transmission for a first set of stations or a first and second set of stations; configuring a common information field of the frame for (1) the first set of stations for the transmission and (2) when the type bit indicates, the second set of stations for the transmission; configuring a set of user information fields of the frame for (1) the first set of stations for the transmission and (2) when the type bit indicates, the second set of stations for the transmission; and transmitting the frame to (1) the first set of stations and (2) the second set of stations when the type bit indicates that the frame is scheduling for the first and second set of stations.

20 Claims, 52 Drawing Sheets

Related U.S. Application Data on Oct. 26, 2020, provisional application No. 63/091,249, filed on Oct. 13, 2020, provisional application No. 63/090,103, filed on Oct. 9, 2020, provisional application No. 63/057,026, filed on Jul. 27, 2020.

(56) References Cited

U.S. PATENT DOCUMENTS

| | | | |
|---|---|---|---|
| 2019/0021106 A1* | 1/2019 | Oteri | H04W 52/24 |
| 2020/0137727 A1* | 4/2020 | Min | H04W 72/121 |
| 2021/0006444 A1* | 1/2021 | Jang | H04L 27/2603 |
| 2021/0028917 A1* | 1/2021 | Park | H04L 27/26 |
| 2021/0195622 A1* | 6/2021 | Kim | H04W 72/0453 |
| 2021/0227529 A1* | 7/2021 | Chu | H04W 72/0406 |
| 2022/0021559 A1* | 1/2022 | Sethi | H04W 4/06 |

OTHER PUBLICATIONS

IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.

IEEE Std 802.11ac—2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunicationsand information exchange between systems, Local and metropolitan area networks—Specific requirements, Dec. 18, 2013, 425 pages.

IEEE Std 802.11ah—2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, Dec. 7, 2016, 594 pages.

IEEE Std P802.11bd/D1.1, Part 11: Wireless LAN Medium Access Control (MAC) and Physical Layer (PHY) Specifications, Amendment 5: Enhancements for Next Generation Vehicular Communication, IEEE Draft Standard for Information technology—Telecommunications and information exchange between systems, Local and metropolitan area networks—Specific requirements, Dec. 2020, 102 pages.

\* cited by examiner

| MAXIMUM PHY RATE | PHY RATE ENHANCEMENT | BANDWIDTH/NUMBER OF SPATIAL STREAMS | OPERATING BANDS | |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG}$ * 4 μs | 3.2 μs | 0.8 μs | 312.5 kHz |
| EHT-SIG FIELD 722 | EHT SIGNAL FIELD | $N_{EHESIG}$ * 4 μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF}$ * (DTF period + GI) μs | 2xLTF: 6.4 μs; 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA}$ * (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

| RU type | RU index and subcarrier range | | | | |
|---|---|---|---|---|---|
| 26-tone RU | RU 1 [−121:−96] | RU 2 [−95:−70] | RU 3 [−68:−43] | RU 4 [−42:−17] | RU 5 [−16:−4, 4:16] |
| 52-tone RU | RU 6 [17:42] | RU 7 [43:68] | RU 8 [70:95] | RU 9 [96:121] | |
| 106-tone RU | RU 1 [−121:−70] | RU 2 [−68:−17] | RU 3 [17:68] | RU 4 [70:121] | |
| | | | RU 2 [17:122] | | |
| 242-tone RU | RU 1 [−122:−17] | | | | |
| | RU 1 [−122:−2, 2:122] | | | | |

The subcarrier index of 0 corresponds to the DC tone. Negative subcarrier indices correspond to subcarriers with frequency lower than the DC tone, and positive subcarrier indices correspond to subcarriers with frequency higher than the DC tone.

RU 5 is the middle 26-tone RU.

FIG. 8

| RU type | RU index and subcarrier range | | | | |
|---|---|---|---|---|---|
| 26-tone RU | RU 1 [-243:-218] | RU 2 [-217:-192] | RU 3 [-189:-164] | RU 4 [-163:-138] | RU 5 [-136:-111] |
| | RU 6 [-109:-84] | RU 7 [-83:-58] | RU 8 [-55:-30] | RU 9 [-29:-4] | |
| | RU 10 [4:29] | RU 11 [30:55] | RU 12 [58:83] | RU 13 [84:109] | RU 14 [111:136] |
| | RU 15 [138:163] | RU 16 [164:189] | RU 17 [192:217] | RU 18 [218:243] | |
| 52-tone RU | RU 1 [-243:-192] | RU 2 [-189:-138] | RU 3 [-109:-58] | RU 4 [-55:-4] | |
| | RU 5 [4:55] | RU 6 [58:109] | RU 7 [138:189] | RU 8 [192:243] | |
| 106-tone RU | RU 1 [-243:-138] | RU 2 [-109:-4] | RU 3 [4:109] | RU 4 [138:243] | |
| 242-tone RU | RU 1 [-244:-3] | | RU 2 [3:244] | | |
| 484-tone RU | RU 1 [-244:-3, 3:244] | | | | |

FIG. 9

| RU type | RU index and subcarrier range | | | | |
|---|---|---|---|---|---|
| 26-tone RU | RU 1 [−499: −474] | RU 2 [−473: −448] | RU 3 [−445: −420] | RU 4 [−419: −394] | RU 5 [−392: −367] |
| | RU 6 [−365: −340] | RU 7 [−339: −314] | RU 8 [−311: −286] | RU 9 [−285: −260] | |
| | RU 10 [−252: −227] | RU 11 [−226: −201] | RU 12 [−198: −173] | RU 13 [−172: −147] | RU 14 [−145: −120] |
| | RU 15 [−118: −93] | RU 16 [−92: −67] | RU 17 [−64: −39] | RU 18 [−38: −13] | |
| | RU 19 [13: 38] | RU 20 [39: 64] | RU 21 [67: 92] | RU 22 [93: 118] | RU 23 [120: 145] |
| | RU 24 [147: 172] | RU 25 [173: 198] | RU 26 [201: 226] | RU 27 [227: 252] | |
| | RU 28 [260: 285] | RU 29 [286: 311] | RU 30 [314: 339] | RU 31 [340: 365] | RU 32 [367: 392] |
| | RU 33 [394: 419] | RU 34 [420: 445] | RU 35 [448: 473] | RU 36 [474: 499] | |
| 52-tone RU | RU 1 [−499: −448] | RU 2 [−445: −394] | RU 3 [−365: −314] | RU 4 [−311: −260] | |
| | RU 5 [−252: −201] | RU 6 [−198: −147] | RU 7 [−118: −67] | RU 8 [−64: −13] | |
| | RU 9 [13: 64] | RU 10 [67: 118] | RU 11 [147: 198] | RU 12 [201: 252] | |
| | RU 13 [260: 311] | RU 14 [314: 365] | RU 15 [394: 445] | RU 16 [448: 499] | |
| 106-tone RU | RU 1 [−499: −394] | RU 2 [−365: −260] | RU 3 [−252: −147] | RU 4 [−118: −13] | |
| | RU 5 [13: 118] | RU 6 [147: 252] | RU 7 [260: 365] | RU 8 [394: 499] | |
| 242-tone RU | RU 1 [−500: −259] | RU 2 [−253: −12] | RU 3 [12: 253] | RU 4 [259: 500] | |
| 484-tone RU | RU 1 [−500: −259, −253: −12] | | RU 2 [12: 253, 259: 500] | | |
| 996-tone RU | RU 1 [−500: −3, 3: 500] | | | | |

FIG. 10

| B0 (EHT) | B1 (HE) | Meaning |
|---|---|---|
| 0 | 0 | VHT NDP Announcement indication |
| 0 | 1 | HE NDP Announcement indication |
| 1 | 0 | EHT NDP Announcement indication (a first EHT NDPA) |
| 1 | 1 | EHT NDP Announcement indication (a second EHT NDPA) |

FIG. 24

| PARTIAL BW INFORMATION | FEEDBACK RU OR MRU | | | | | | |
|---|---|---|---|---|---|---|---|
| 0 0001 0000 | | | | 242 | | | |

FIG. 27

| PARTIAL BW INFORMATION | FEEDBACK RU OR MRU | | | | | | |
|---|---|---|---|---|---|---|---|
| 1 0001 0000 | | | | | 484 | | |

FIG. 28

| PARTIAL BW INFORMATION | FEEDBACK RU OR MRU | | | | | | |
|---|---|---|---|---|---|---|---|
| 0001 0000 | | | | 242 | | | |

FIG. 29

| PARTIAL BW INFORMATION | FEEDBACK RU OR MRU | | | | | | |
|---|---|---|---|---|---|---|---|
| 0001 0000 | | | 484 | | | | |

FIG. 30

| Variant | B0 | B1 | B2–B29 | B30 | B31 |
|---|---|---|---|---|---|
| HT | 0 | | HT Control Middle | AC Constraint | RDG/More PPDU |
| VHT | 1 | 0 | VHT Control Middle | AC Constraint | RDG/More PPDU |
| HE | 1 | 1 | | A-Control | |

FIG. 32

| Control ID value | Meaning | Length of the Control Information subfield (bits) |
| --- | --- | --- |
| 0 | Triggered response scheduling (TRS) | 26 |
| 1 | Operating mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7-14 | Reserved | |
| 15 | Ones need expansion surely (ONES) | 26 |

FIG. 35

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

FIG. 39

Option #1: Reserved AID | EHT UL BW | Other EHT-specific parameters

Option #2: Reserved AID | EHT AID | RU allocation | Other EHT-specific parameters

FIG. 42

| MAC header | Common Info | User Info List | User Info with AID 4095 | EHT Common Info | EHT User Info List |

FIG. 43

| 00 (BxB39) | HE TB PPDU |
|---|---|
| 01 | EHT TB PPDU |
| 11 | EHT+ TB PPDU |

FIG. 46

- Option 1

| L-STF | L-LTF | L-SIG | RL-SIG | U-SIG | HE+-STF | HE-LTF | PE |
|---|---|---|---|---|---|---|---|
| 8μs | 8μs | 4μs | 4μs | 8μs | 4μs | Variable duration | 4μs |

- Option 2

| L-STF | L-LTF | L-SIG | RL-SIG | U-SIG | HE+ SIG | HE+-STF | HE+-LTF | PE |
|---|---|---|---|---|---|---|---|---|
| 8μs | 8μs | 4μs | 4μs | 8μs | 4 (or 8) μs | 4μs | Variable duration | 4μs |

FIG. 49

| B23-B25 | NSTS And Midamble Periodicity | 3 | If the Doppler field is 0, indicates the number of space-time streams. Set to the number of space-time streams minus 1. For an HE ER SU PPDU, values 2-7 are reserved.<br><br>If the Doppler field is 1, then B23-B24 indicates the number of space-time streams, up to 4, and B25 indicates the midamble periodicity. B23-B24 is set to the number of space time streams minus 1. For an HE ER SU PPDU, values 2 and 3 are reserved. B25 is set to 0 for 10 symbol midamble periodicity, to 1 for 20 symbol midamble periodicity. See TXVECTOR parameter MIDAMBLE_PERIODICITY. |

SETTING, BY AN ACCESS POINT, A TYPE BIT IN A TRIGGER FRAME TO INDICATE A TYPE OF THE TRIGGER FRAME, WHEREIN THE TYPE BIT INDICATES WHETHER THE TRIGGER FRAME IS SCHEDULING AN UPLINK TRANSMISSION FOR ONLY A FIRST SET OF STATIONS IN A WIRELESS NETWORK OR THE FIRST SET OF STATIONS AND A SECOND SET OF STATIONS IN THE WIRELESS NETWORK
5102

CONFIGURING, BY THE ACCESS POINT, A COMMON INFORMATION FIELD OF THE TRIGGER FRAME, WHEREIN THE COMMON INFORMATION FIELD IS TO BE USED BY (1) ALL STATIONS IN THE FIRST SET OF STATIONS FOR PERFORMING THE UPLINK TRANSMISSION AND (2) WHEN THE TYPE BIT INDICATES THAT THE TRIGGER FRAME IS SCHEDULING THE UPLINK TRANSMISSION FOR THE FIRST SET OF STATIONS AND THE SECOND SET OF STATIONS IN THE WIRELESS NETWORK, ALL STATIONS IN THE SECOND SET OF STATIONS FOR PERFORMING THE UPLINK TRANSMISSION
5104

CONFIGURING, BY THE ACCESS POINT, A SET OF USER INFORMATION FIELDS FOR THE TRIGGER FRAME, WHEREIN THE SET OF USER INFORMATION FIELDS IS TO BE USED BY (1) ALL STATIONS IN THE FIRST SET OF STATIONS FOR PERFORMING THE UPLINK TRANSMISSION AND (2) WHEN THE TYPE BIT INDICATES THAT THE TRIGGER FRAME IS SCHEDULING THE UPLINK TRANSMISSION FOR THE FIRST SET OF STATIONS AND THE SECOND SET OF STATIONS IN THE WIRELESS NETWORK, ALL STATIONS IN THE SECOND SET OF STATIONS FOR PERFORMING THE UPLINK TRANSMISSION
5106

TRANSMITTING THE TRIGGER FRAME TO (1) ALL STATIONS IN THE FIRST SET OF STATIONS WHEN THE TYPE BIT INDICATES THAT THE TRIGGER FRAME IS SCHEDULING THE UPLINK TRANSMISSION FOR THE FIRST SET OF STATIONS AND (2) ALL STATIONS IN THE SECOND SET OF STATIONS WHEN THE TYPE BIT INDICATES THAT THE TRIGGER FRAME IS SCHEDULING THE UPLINK TRANSMISSION FOR THE FIRST SET OF STATIONS AND THE SECOND SET OF STATIONS
5108

5202
RECEIVING, BY A STATION FROM AN ACCESS POINT, A TRIGGER FRAME, WHEREIN THE TRIGGER FRAME INCLUDES A TYPE BIT TO INDICATE A TYPE OF THE TRIGGER FRAME, WHEREIN THE TYPE BIT INDICATES WHETHER THE TRIGGER FRAME IS SCHEDULING AN UPLINK TRANSMISSION FOR ONLY A FIRST SET OF STATIONS IN A WIRELESS NETWORK OR THE FIRST SET OF STATIONS AND A SECOND SET OF STATIONS IN THE WIRELESS NETWORK

5204
PROCESSING, BY THE STATION, A COMMON INFORMATION FIELD OF THE TRIGGER FRAME, WHEREIN THE COMMON INFORMATION FIELD IS TO BE USED BY (1) ALL STATIONS IN THE FIRST SET OF STATIONS FOR PERFORMING THE UPLINK TRANSMISSION AND (2) WHEN THE TYPE BIT INDICATES THAT THE TRIGGER FRAME IS SCHEDULING THE UPLINK TRANSMISSION FOR THE FIRST SET OF STATIONS AND THE SECOND SET OF STATIONS IN THE WIRELESS NETWORK, ALL STATIONS IN THE SECOND SET OF STATIONS FOR PERFORMING THE UPLINK TRANSMISSION

5206
PROCESSING, BY THE STATION, A SET OF USER INFORMATION FIELDS OF THE OF THE TRIGGER FRAME, WHEREIN THE SET OF USER INFORMATION FIELDS IS TO BE USED BY (1) ALL STATIONS IN THE FIRST SET OF STATIONS FOR PERFORMING THE UPLINK TRANSMISSION AND (2) WHEN THE TYPE BIT INDICATES THAT THE TRIGGER FRAME IS SCHEDULING THE UPLINK TRANSMISSION FOR THE FIRST SET OF STATIONS AND THE SECOND SET OF STATIONS IN THE WIRELESS NETWORK, ALL STATIONS IN THE SECOND SET OF STATIONS FOR PERFORMING THE UPLINK TRANSMISSION

5208
TRANSMITTING A RESPONSE TO THE TRIGGER FRAME BASED ON THE COMMON INFORMATION FIELD AND THE SET OF USER INFORMATION FIELDS

FIG. 52

SIGNALING METHOD FOR MULTIPLEXING DIFFERENT AMENDMENT DEVICES IN AN ENHANCED WIRELESS LOCAL AREA NETWORK

CROSS-REFERENCE TO RELATED APPLICATION

This application claims the benefit of U.S. Provisional Patent Application No. 63/057,026, filed Jul. 27, 2020; U.S. Provisional Patent Application No. 63/090,103, filed Oct. 9, 2020; U.S. Provisional Patent Application No. 63/091,249, filed Oct. 13, 2020; U.S. Provisional Patent Application No. 63/105,675, filed Oct. 26, 2020; and U.S. Provisional Patent Application No. 63/110,291, filed Nov. 5, 2020, which are incorporated by reference herein in their entirety.

TECHNICAL FIELD

The present disclosure generally relates to wireless communications, and more specifically, relates to multiple resource unit signaling in a wireless local area network.

BACKGROUND ART

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIG. 8 shows example subcarrier/tone indices for resource units for a 20 MHz EHT Physical Layer (PHY) Protocol Data Unit (PPDU), in accordance with some embodiments of the present disclosure.

FIG. 9 shows some example subcarrier/tone indices for resource units in a 40 MHz High Efficiency (HE)/EHT PPDU, in accordance with some embodiments of the present disclosure.

FIG. 10 shows some example subcarrier/tone indices for resource units in an 80 MHz HE/EHT PPDU, in accordance with some embodiments of the present disclosure.

FIG. 24 shows a table for identifying NDP announcement frames, in accordance with some embodiments of the present disclosure.

FIG. 27 shows a partial bandwidth information subfield based on a 20 MHz/242-tone resolution per resource unit, in accordance with some embodiments of the present disclosure.

FIG. 28 shows a partial bandwidth information subfield based on a 40 MHz/484-tone resolution per resource unit, in accordance with some embodiments of the present disclosure.

FIG. 29 shows a partial bandwidth information subfield based on a 20 MHz/242-tone resolution per resource unit, in accordance with some embodiments of the present disclosure.

FIG. 30 shows a partial bandwidth information subfield based on a 40 MHz/484-tone resolution per resource unit, in accordance with some embodiments of the present disclosure.

FIG. 32 shows an HE A-Control frame format, in accordance with some embodiments of the present disclosure.

FIG. 35 shows a table that defines values of a control ID subfield and associated lengths of a control information subfield, in accordance with some embodiments of the present disclosure.

FIG. 39 shows a trigger type table for identifying trigger frame variants, in accordance with some embodiments of the present disclosure.

FIG. 42 shows a new common information field and user information field, in accordance with some embodiments of the present disclosure.

FIG. 43 shows another enhanced trigger frame, in accordance with some embodiments of the present disclosure.

FIG. 46 shows table to differentiate different trigger-based PPDUs, in accordance with some embodiments of the present disclosure.

FIG. 49 shows multiple options for an NDP format, in accordance with some embodiments of the present disclosure.

FIG. 50 shows a table for interpreting an NSTS and Midamble Periodicity field, in accordance with some embodiments of the present disclosure.

FIG. 51 shows a method communicating in a wireless network, in accordance with some embodiments of the present disclosure.

FIG. 52 shows a method communicating in a wireless network, in accordance with some embodiments of the present disclosure.

DETAILED DESCRIPTION

Figure 1:
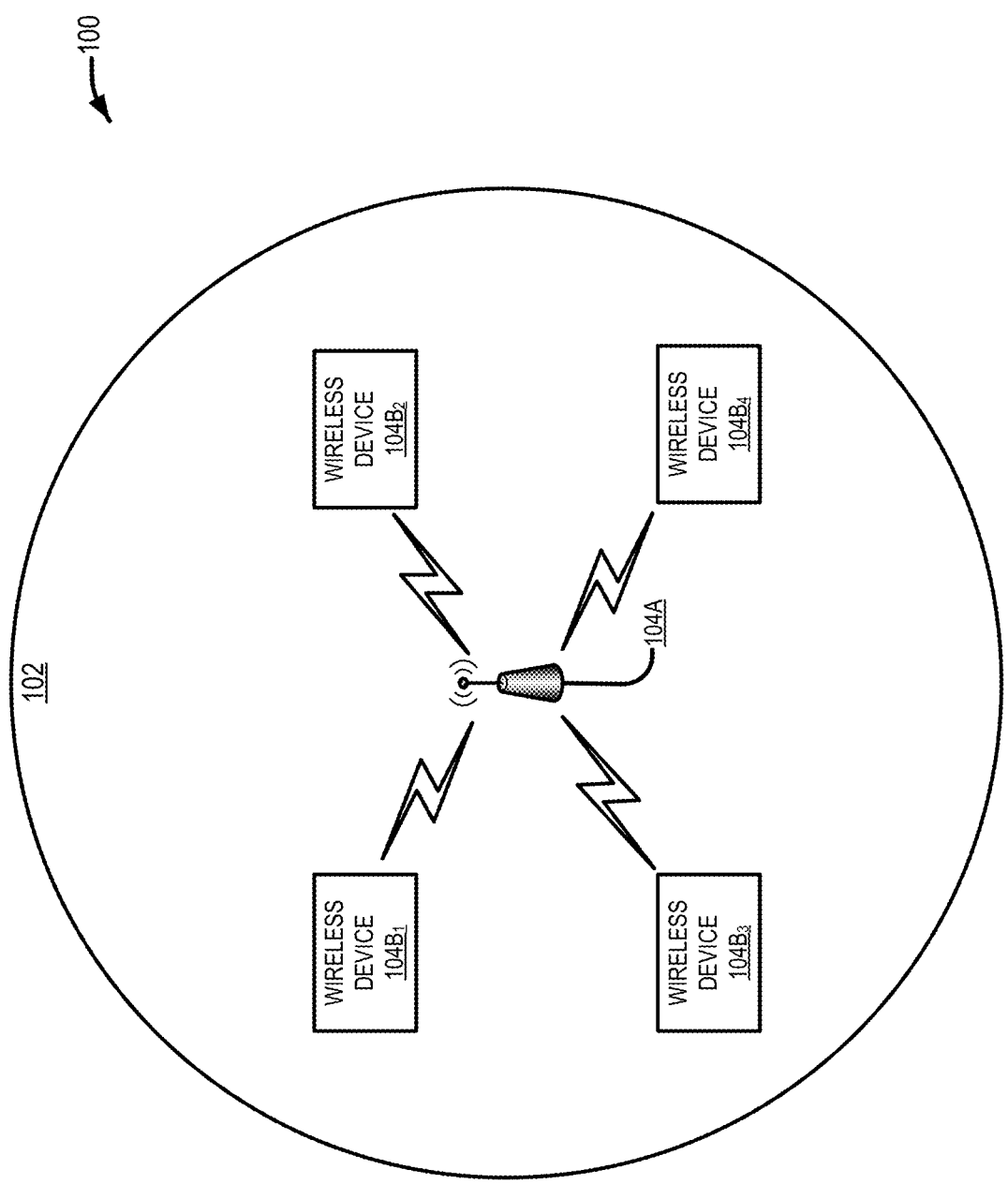
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to a resource unit allocation in a wireless local area network.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B$_1$-104B$_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B$_1$-104B$_4$) may be collectively referred to as STAs. However, for ease of description, only the non-AP STAs may be referred to as STAs. Although shown with four non-AP STAs (e.g., the wireless devices 104B$_1$-104B$_4$), the WLAN 100 may include any number of non-AP STAs (e.g., one or more wireless devices 104B).

Figure 2:
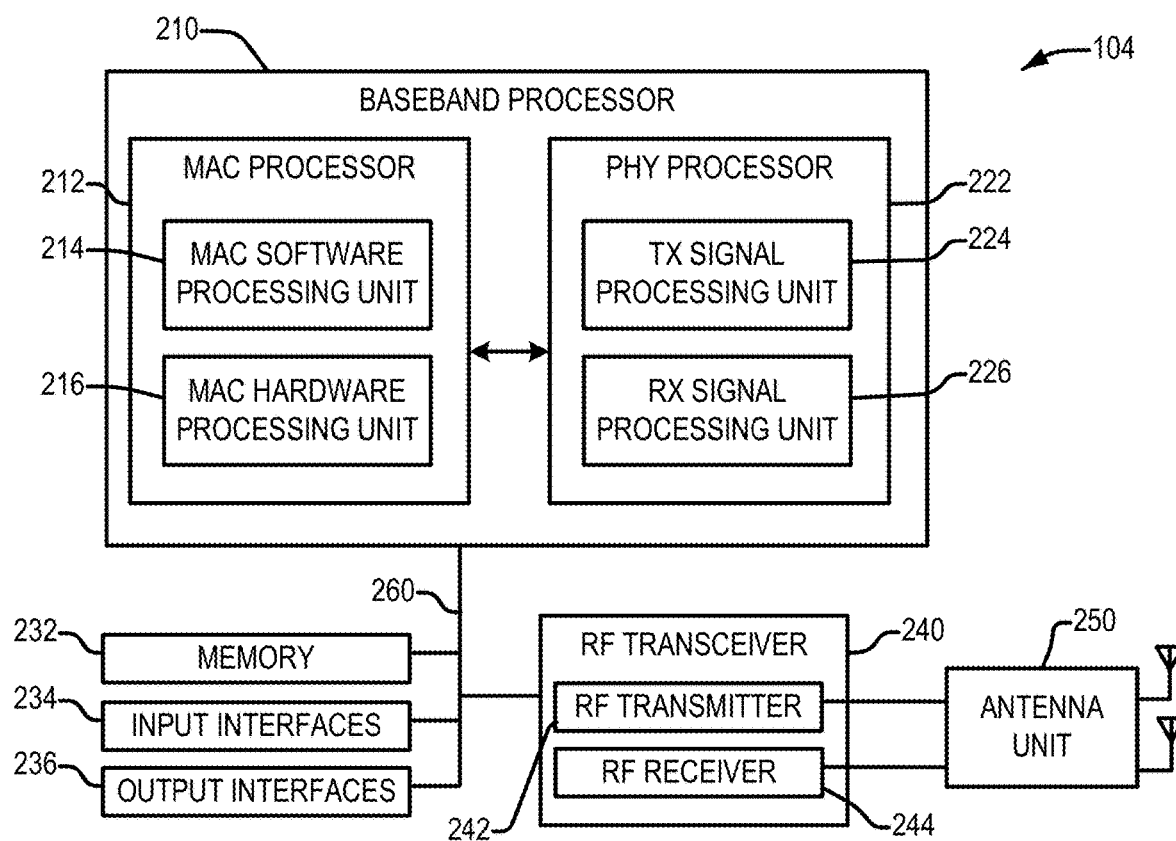
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104B$_1$-104B$_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
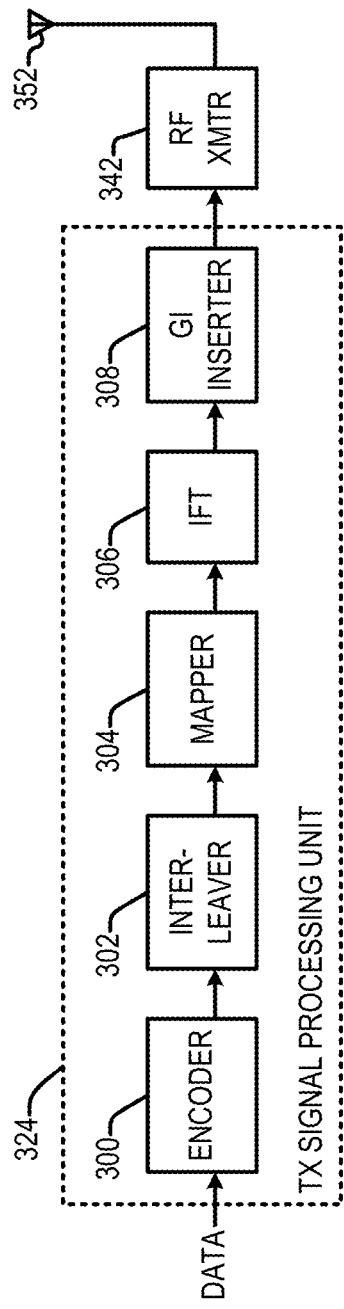
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
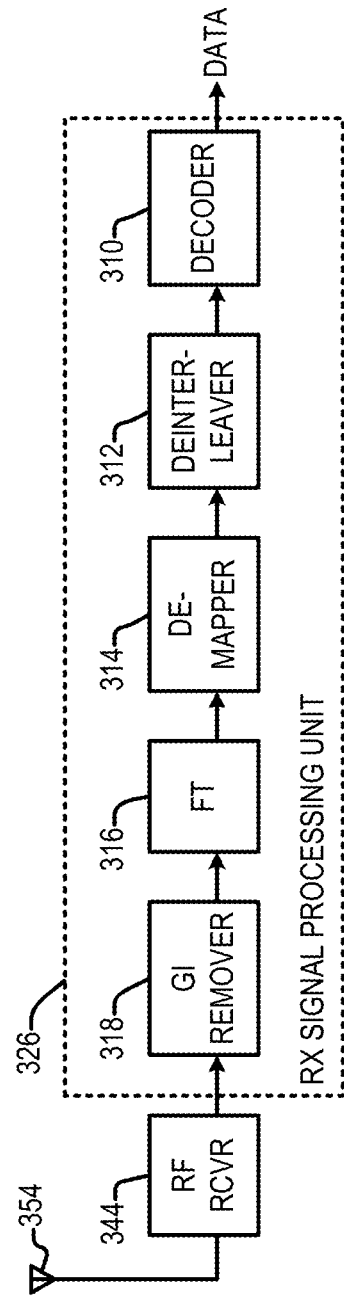
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, and 160 MHz contiguous channel widths and support for an 80+80 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
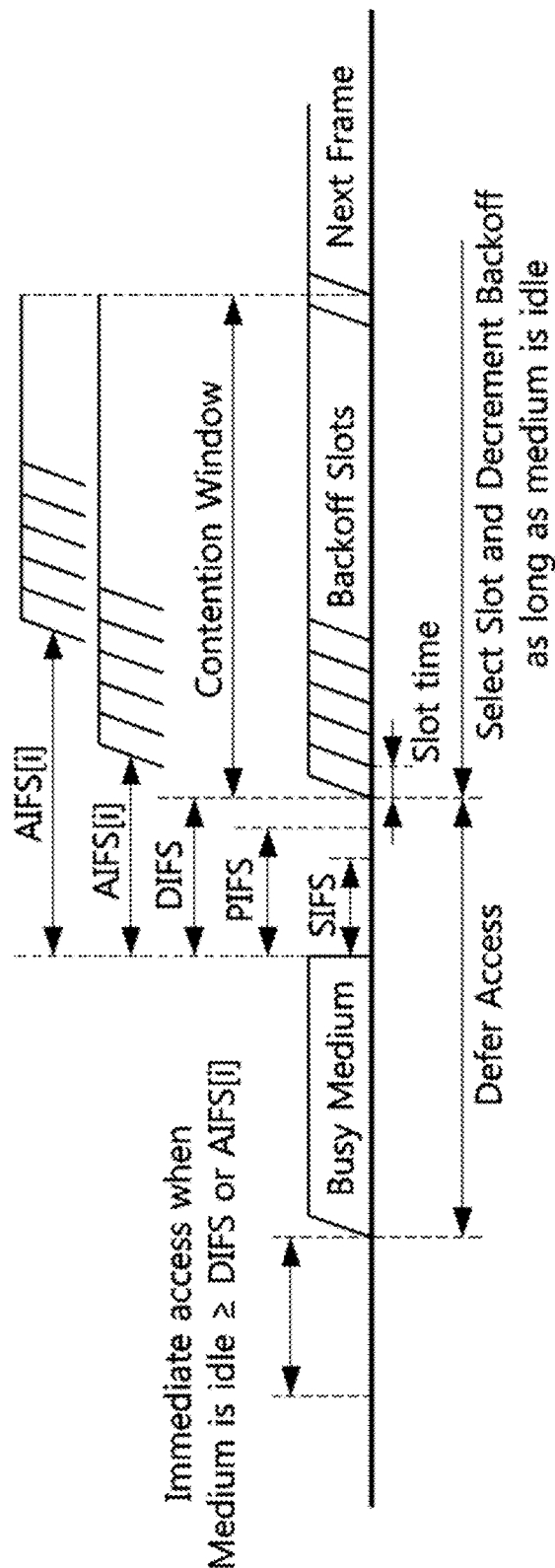
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
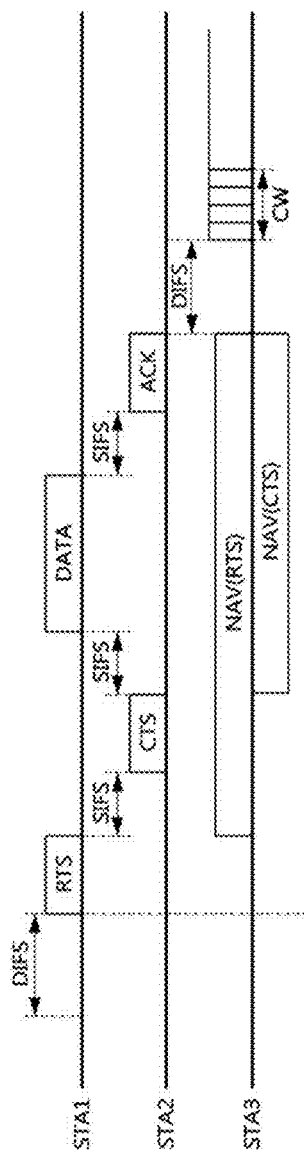
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (BX) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFT) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

An EHT PPDU using OFDMA can carry a mixture of resource units (sometimes referred to as RUs or MRUs), including 26-tone resource units, 52-tone resource units, 52+26-tone resource units, 106-tone resource units, 106+26-tone resource units, 242-tone resource units, 484-tone resource units, 996-tone resource units, etc. Some example subcarrier/tone indices for resource units for a 20 MHz EHT PPDU are shown in FIG. 8. FIG. 9 shows some example subcarrier/tone indices for resource units in a 40 MHz HE/EHT PPDU. FIG. 10 shows some example subcarrier/tone indices for resource units in an 80 MHz HE/EHT PPDU, including when OFDMA is not used. The examples of FIG. 10 are applicable to EHT PPDUs and PPDU generations/versions beyond EHT (sometimes referred to as EHT+). The OFDMA numerology could be applied to any 80 MHz channel within 160 MHz, 240 MHz, or 320 MHz channels/operations, including one or multiple 80 MHz subchannels that are punctured out.

The distributed nature of a channel access network, such as in IEEE 802.11 wireless networks, makes carrier sensing (CS) mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink(UL)/downlink(DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP coordination has been discussed as a possible technology to be adopted in IEEE 802.11be, where there is high level classification depending on various AP coordination schemes. For example, there is a first type of technique in which data for a user is sent from a single AP (sometimes referred to as "coordinated") or there is a second type of technique in which data for a user is sent from multiple APs (sometimes referred to as "joint").

For the coordinated AP technique, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. As for a joint AP technique, multiple APs are transmitting jointly to a given user.

For wide bandwidths, such as 240 MHz or 320 MHz in 6 GHz, it might be hard for one STA to occupy the entire bandwidth because of incumbent devices operating according to previous amendment/standard devices (e.g., wireless stations operating according to IEEE 802.11ax or previous versions). For example, since IEEE 802.11ax STAs capable of 80/160 MHz operation need to decode the preamble on a primary 20 MHz first to get important control information (e.g., bandwidth information) from signal fields to decode the remaining portion of the PPDU, these STAs are likely to stay at least within a primary 80 MHz subchannel.

Figure 11:
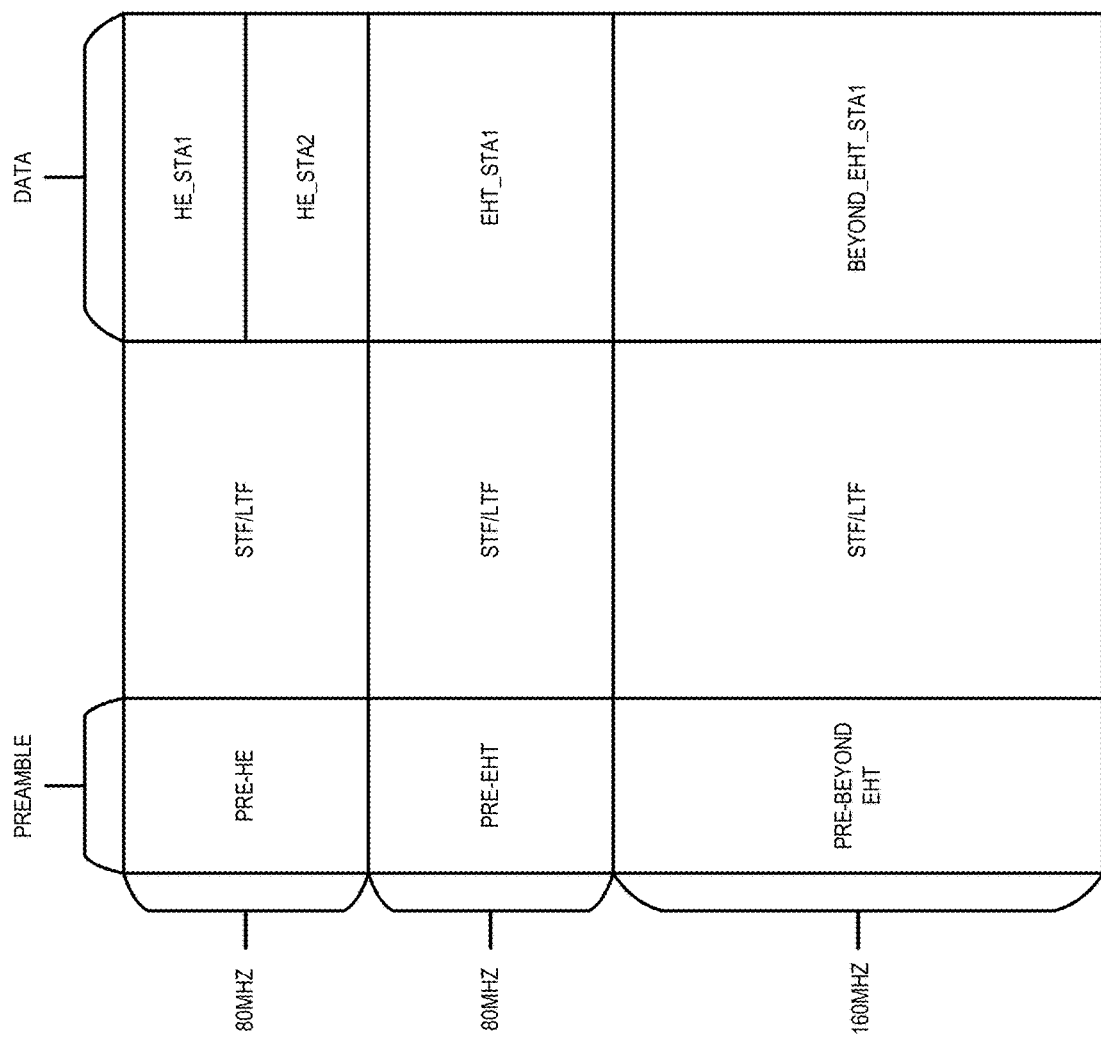
FIG. 11 shows a mixed transmission in an aggregated PPDU, in accordance with some embodiments of the present disclosure.

To increase the efficiency, a new mechanism could be used. For example, the new mechanism enables multiplexing of transmissions according to the EHT standard along with transmissions from previous standards (e.g., IEEE 802.11ax/HE) or future standards (e.g., standards that are beyond IEEE 802.11be/EHT). One example of this mixed transmission is shown in FIG. 11. In FIG. 11, the pre-HE, pre-EHT, and pre-beyond EHT denote the unique preamble parts of the PPDU, before corresponding STFs and LTFs of sub-PPDUs for three different amendments to IEEE 802.11 (e.g., HE, EHT, and beyond EHT, respectively).

In the example of FIG. 11, HE devices are on the primary 80 MHz and may fully reuse the HE processing procedure. In terms of HE STAs, all flows are transparent during the multiplexing period time. Namely, HE STAs can decode and properly interpret corresponding portions of the aggregated PPDU without error but will not be able to properly interpret other EHT or beyond EHT features of the PPDU. As for EHT and beyond EHT devices, those devices can figure out the new rules to be defined and process its own assigned portion of the aggregated PPDU correctly. The new structure and rules could include that EHT and beyond EHT devices are present on secondary channels and are without information on the primary 20 MHz. To support this new structure to multiplex different standard/amendment transmissions simultaneously, there are several possible new rules, such as consistent tone spacing between different amendment STAs and preamble design considerations (especially for RU allocation positions and symbol alignment between 80 MHz segments/160 MHz segments depending on the STAs capable bandwidth).

Figure 12:
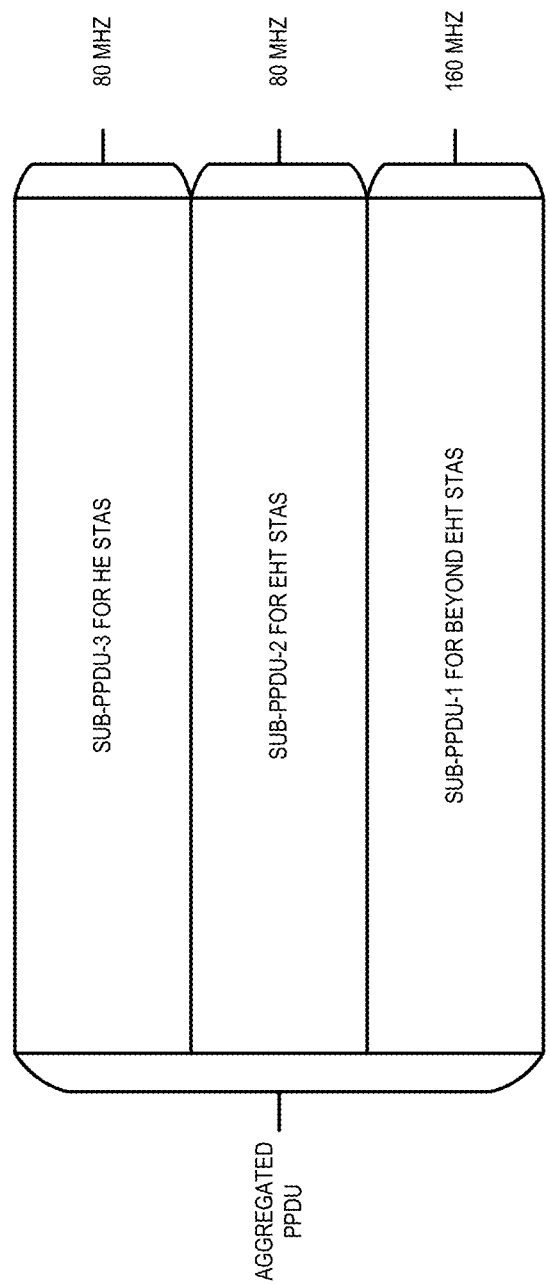
FIG. 12 shows an example aggregated PPDU with a set of sub-PPDUs, in accordance with some embodiments of the present disclosure.

In one embodiment, to multiplex different amendment/standards by multiple STAs in downlink or uplink directions, a new PPDU format and corresponding procedures is proposed. The PPDU includes multiple sub-PPDUs, where each sub-PPDU could be processed according to different amendments/standards. FIG. 12 shows one example in which each sub-PPDU is orthogonal in frequency domain symbol by symbol by the same tone spacing or the same guard interval values or same MCS for a signaling portion or a data portion. In particular, each sub-PPDU occupies non-overlapping frequency segments and has the same or different PPDU formats. For example, sub-PPDU3 contains data for one HE STA over the primary 80 MHz while sub-PPDU2 and sub-PPDU1 contains the data for one or more EHT STAs (or beyond EHT STAs) over the secondary subchannels.

Figure 13:
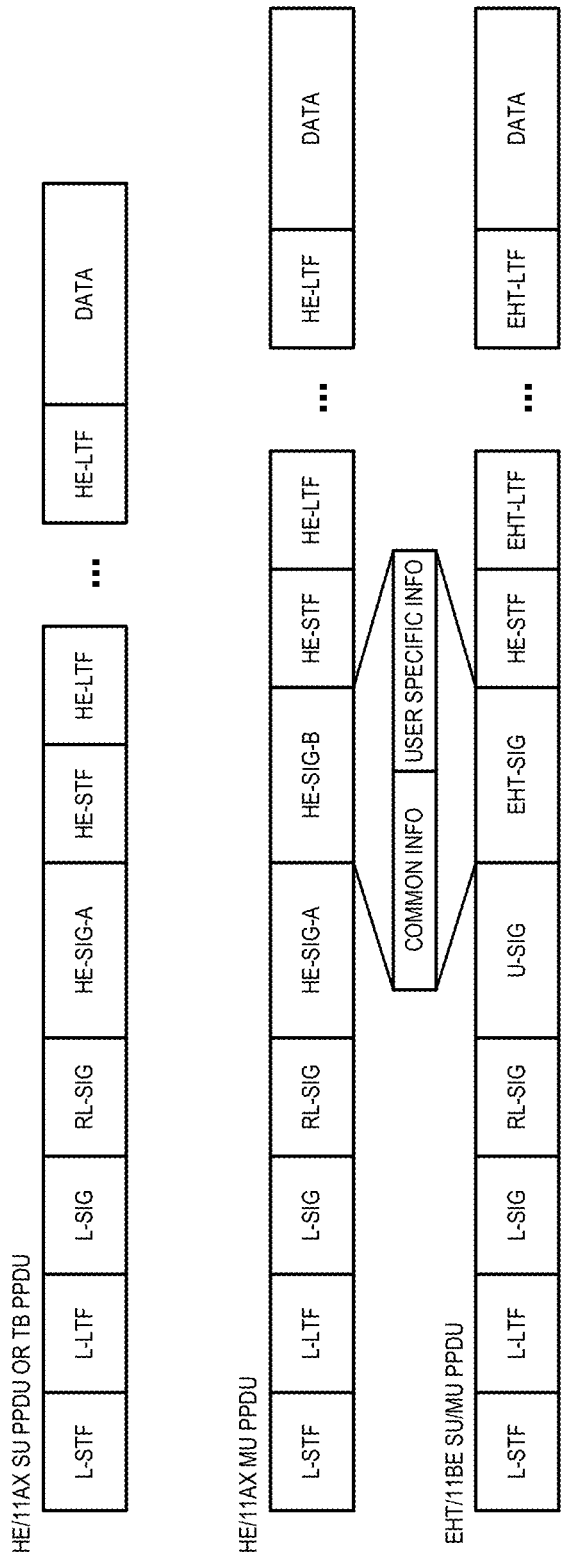
FIG. 13 shows one example of HE multi-user (MU) PPDU format aligning with an EHT single-user (SU)/MU PPDU format, in accordance with some embodiments of the present disclosure.

To reduce unnecessary padding for sub-PPDUs to align their preamble portion, the sub-PPDUs for HE STAs can use an HE MU PPDU format (not the HE SU PPDU format) even though an SU transmission is being performed. Since the HE MU PPDU format contains an HE-SIG-B field, it is easier to support preamble alignment across sub-PPDUs when EHT or a beyond EHT frame format is supported. FIG. 13 shows one example of the HE MU PPDU format aligning with the EHT SU/MU PPDU format.

Without an HE-SIG-B field for an HE SU PPDU in a single user transmission, it is hard to align preambles between an HE sub-PPDU and an EHT or beyond-EHT sub-PPDU. In FIG. 13, the EHT PPDU format is an EHT SU/MU PPDU format. This PPDU format is used for both single-user (SU) transmissions and multi-user (MU) transmissions. For each sub-PPDU assigned for an HE STA(s) and an EHT STA(s), the number of STAs could be one or more. However, to reduce unnecessary padding, the number of STAs assigned to each sub-PPDU may be the same or similar. For example, N or (N+1) users could be assigned for HE sub-PPDUs and N users for EHT sub-PPDUs because the size of some control information for EHT is likely to be increased in comparison to HE, which may require more space in signaling fields.

In one embodiment, in the aggregated PPDU format described herein, one of the sub-PPDUs for transmitting or receiving data to/from an HE STA uses the HE MU PPDU format when a single user transmission is conducted (as noted above). The HE MU PPDU format is transparent to one HE STA. Namely, the HE STA can properly interpret all fields in the HE MU PPDU without error. In some embodiments, the HE MU PPDU format is used as one of the sub-PPDUs for transmitting or receiving data to/from multiple HE STAs.

In IEEE 802.11ax, N RU allocation subfields are present in an HE-SIG-B content channel of the HE-SIG-B field to indicate an RU position and its assigned STA's number for its corresponding subchannels. For example, N is set to 1 if bandwidth information of the PPDU indicates 20 MHz or 40 MHz. N is set to 2 if bandwidth information of the PPDU indicates 80 MHz. N is set to 4 if bandwidth information of the PPDU indicates 160 MHz. Given that the size of the RU allocation subfield could be increased to cover a wider bandwidth (e.g., it can cause use of padding bits), to reduce unnecessary padding inserted for sub-PPDUs, it may be better to limit which capable STAs could be assigned to each sub-PPDU. For example, once the Primary 80 MHz is assigned to an 80 MHz operating HE STA(s) with two RU allocation subfields used in a common information field over one sub-PPDU, the rest of the sub-PPDUs are limited to 80 MHz for EHT or beyond EHT STAs. In another example, once the primary 160 MHz is assigned to an 160 MHz operating HE STA(s) with four RU allocation subfields used in a common information field over one sub-PPDU, the rest of the sub-PPDUs are limited to 160 MHz for EHT or beyond EHT STAs. However, in a case where no RU allocation subfield is present (e.g., when using a compressed mode for one sub-PPDU), any capable operating STA could be assigned to each sub-PPDU.

In one embodiment, in the new aggregated format described herein, devices/STAs operating according to different standards/amendments assigned to each sub-PPDU support the same operating bandwidth when the RU allocation subfield is present. The operating bandwidth can be limited statically, or the operating bandwidth can be dynamically changed according to an operation mode change. The operating bandwidth may be decided by the minimum bandwidth among different amendment devices/STAs that seek to participate in the transmission/reception.

Figure 14:
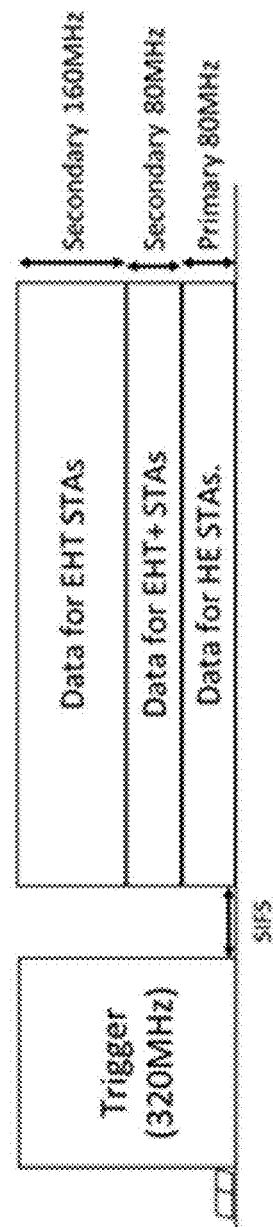
FIG. 14 shows trigger-based transmission using an aggregated PPDU, in accordance with some embodiments of the present disclosure.

In some circumstances, as shown in FIG. 14, HE STAs may operate on the Primary 80 MHz subchannel and EHT STAs (or beyond EHT STAs) operate on the Secondary 80 MHz subchannels. While a new trigger frame for a new amendment/standard may be transparent to HE STAs or previous amendment compliant STAs, this new trigger frame may also transmit additional information for EHT or beyond EHT STAs. Accordingly, at least two different trigger frame formats may be specified, wherein a second trigger frame fully supports new features introduced for EHT STAs and a first trigger frame is transparent/decodable to HE STAs but some fields in this new trigger frame could be reinterpreted for EHT STAs. Additional details regarding this first trigger frame are further described below.

Figure 15:
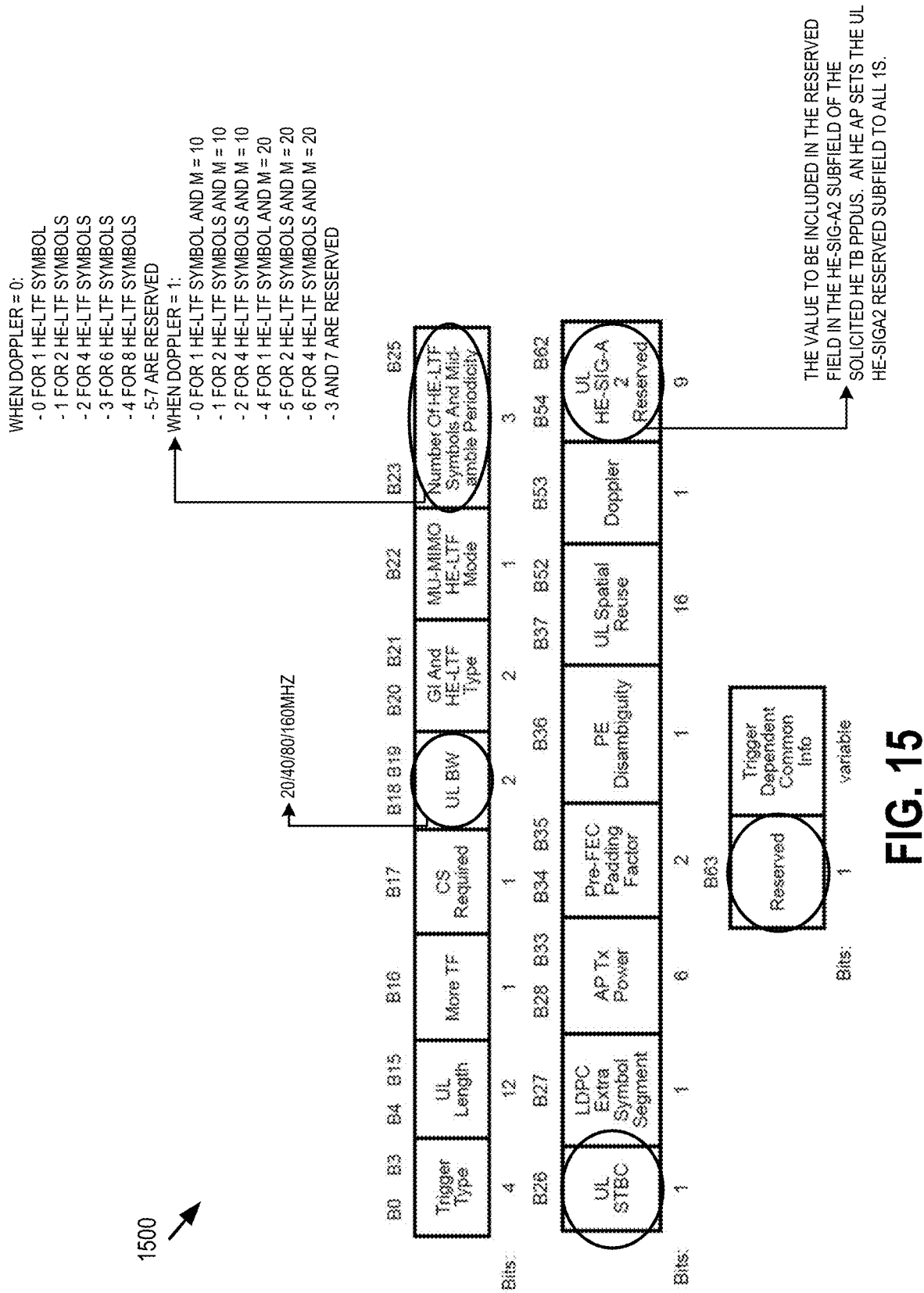
FIG. 15 shows a common information field in a trigger frame, in accordance with some embodiments of the present disclosure.
Figure 16:
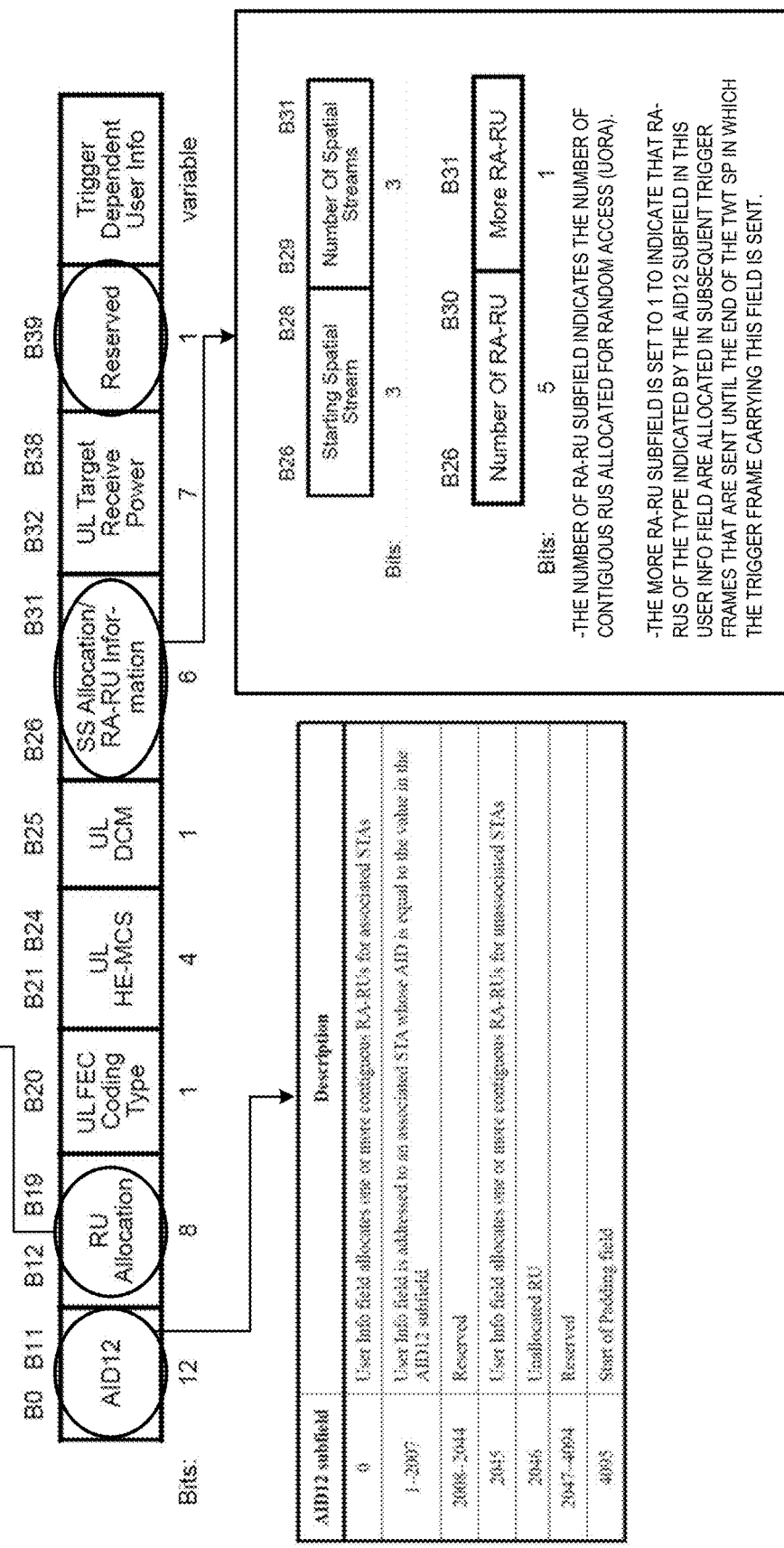
FIG. 16 shows a user information field for a trigger frame, in accordance with some embodiments of the present disclosure.

In one embodiment, this first trigger frame is an HE trigger frame that is modified to support multiplexing different PPDUs corresponding to different amendments/standard capable devices. In this embodiment, the trigger frame can include a common information field and one or more user information fields. FIG. 15 shows a common information field in a trigger frame 1500, according to one example embodiment. As shown, the trigger frame 1500 includes a trigger type field, an uplink (UL) length field, a more trigger frame (TF) field, a CS required field, an uplink (UL) bandwidth (BW) field, a guard interval (GI) and HE-LTF type field, a MU-MIMO HE-LTF mode field, a number of HE-LTF symbols and midamble periodicity field, an uplink (UL) space-time block code (STBC) field, an LDPC extra symbol segment field, an access point (AP) transmission power field, a pre-forward error coding (FEC) padding factor field, a packet extension (PE) disambiguity field, a UL spatial reuse field, a doppler field, an uplink HE-SIG-A2 reserved field, a reserved field, and a trigger dependent common information field. In some embodiments, these fields can be present in an HE trigger frame; however, one or more of the UL BW field, number of HE-LTF symbols and midamble periodicity field, the UL HE-SIG-A2 reserved field, and the reserved field may be modified or reinterpreted. FIG. 16 shows a user information field 1600 for a trigger frame, according to one embodiment. As shown in FIG. 16, the user information field 1600 can include an association identifier (AID) field (i.e., AID12 field), a resource unit (RU) allocation field, an uplink (UL) forward error correction coding type field, an uplink (UL) HE-MCS field, an uplink (UL) DCM field, a spatial stream (SS) allocation/random access resource unit (RA-RU) information field, a UL target RSSI field, a reserved field, and a trigger dependent user information field. In some embodiments, these fields can be present in an HE trigger frame; however, one or more of the AID12 field, RU allocation field, SS allocation/RA-RU information field, and reserved field may be modified or reinterpreted for use with EHT STAs or beyond EHT STAs.

In one embodiment, one field in this updated trigger frame can be used to distinguish between an HE trigger frame and an updated trigger frame. For example, the UL HE-SIG-A2 reserved field could be used to distinguish between an HE trigger frame and an updated trigger frame. For instance, one or more bits in the nine bits of the UL HE-SIG-A2 reserved field of the common information field 1500 can be assigned to distinguish between an HE trigger frame and an updated trigger frame. For example, the first bit (i.e., bit 54 in the common information field 1500) or the first two or three bits could be used to distinguish between an HE trigger frame and an updated trigger frame. Assuming one bit is assigned the value 0/zero could indicate the trigger frame is an updated trigger frame (e.g., an EHT trigger frame) such that some other fields of the trigger frame could be reinterpreted, in comparison to interpretation of an HE trigger frame, for EHT STAs. Assuming two bits are assigned, the value 00/zero could indicate the trigger frame is an updated trigger frame (e.g., an EHT trigger frame) such that some other fields of the trigger frame could be reinterpreted, in comparison to interpretation of an HE trigger frame, for EHT STAs. For example, the UL HE-SIG-A2 reserved field in the common information field 1500 (or the remaining bits in these fields after the one or more bits that are used to distinguish the type of the trigger frame) could be used for EHT STAs. Once the trigger frame is determined to be an EHT trigger frame, all of or part of the UL HE-SIG-A2 reserved field or the reserved field in the common information field 1500 and/or the user information field 1600 could be jointly used to indicate EHT related information for EHT STAs. Additionally, or alternatively, one or more fields in the common information field 1500 and the user information field 1600 could be reinterpreted only for EHT STAs.

As noted above, in one embodiment, an EHT trigger frame format includes first information to indicate whether it is an EHT trigger frame. In some embodiments, the EHT trigger frame is still decodable to HE STAs and can still be interpreted by HE STAs as an HE trigger frame. However, the EHT trigger frame delivers more information for use by EHT or beyond EHT STAs using (1) the UL HE-SIG-A2 reserved field and/or the reserved field in the common information field 1500 and/or the user information field 1600 and/or (2) by reinterpreting some existing fields in an HE trigger frame.

Figure 17:
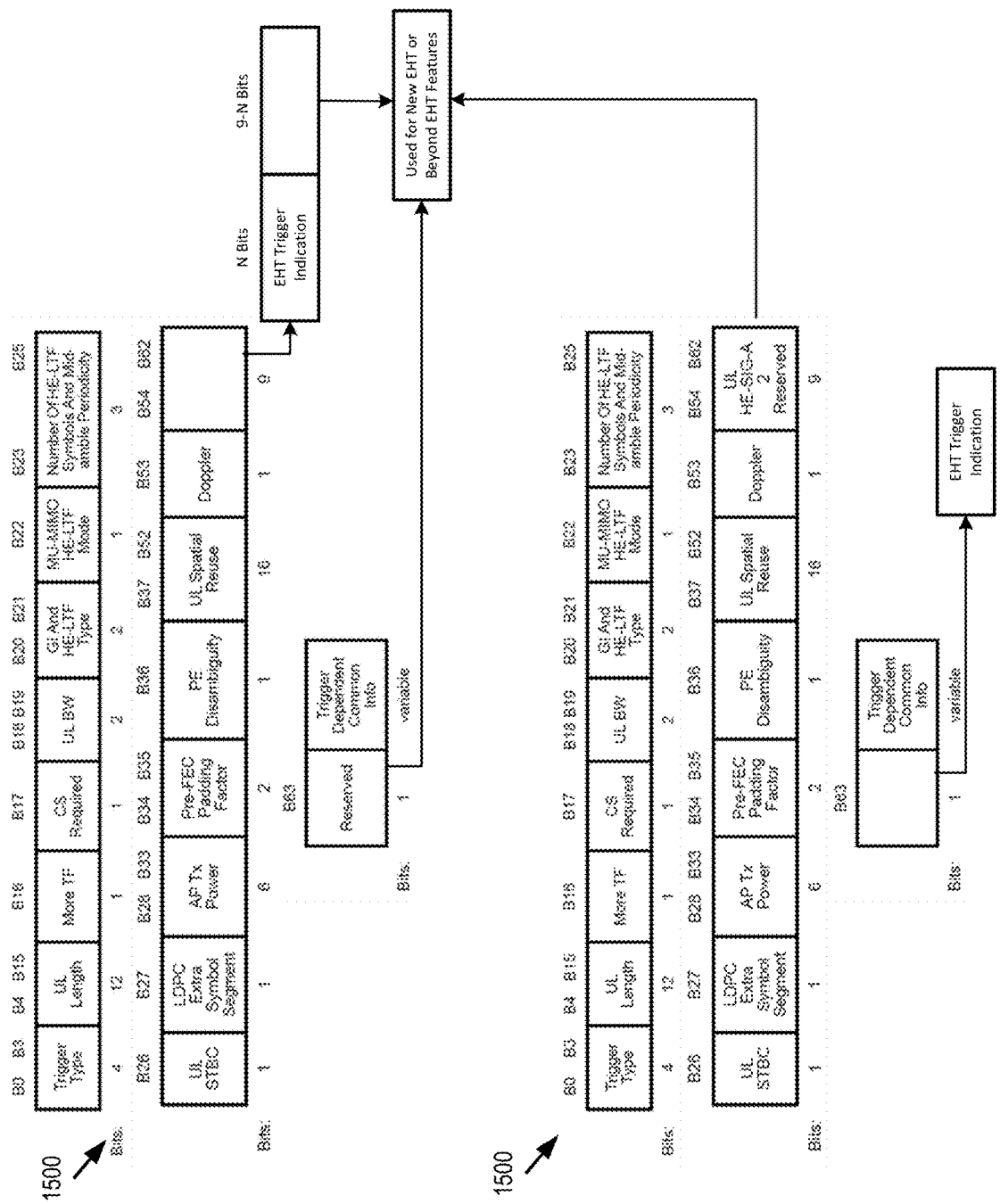
FIG. 17 shows signaling for a type of trigger frame, in accordance with some embodiments of the present disclosure.

In one embodiment, the first information that indicates whether a trigger frame is an EHT trigger frame could take N bits from the UL HE-SIG-A2 reserved field and or the reserved field of the common information field 1500 as shown in FIG. 17. In some embodiments, N could be one or more. In these embodiments, the rest of the bits of the reserved fields, apart from the first information, could be used to indicate new features for EHT or beyond EHT amendments/standards.

In some embodiments, given the limited space in a trigger frame to support multiplexing different amendment STAs (e.g., HE PPDUs and EHT PPDUs), some restrictions may be implemented, such as a number of EHT LTF symbols, a midamble periodicity, a maximum available bandwidth, a maximum available RU size, or a maximum available spatial stream. These limitations could be applied across stations, such that all stations (e.g., HE and EHT) have the same maximums/limits as defined in IEEE 802.11ax. However, in some embodiments, these limitations may not be applied to all functions.

Figure 18:
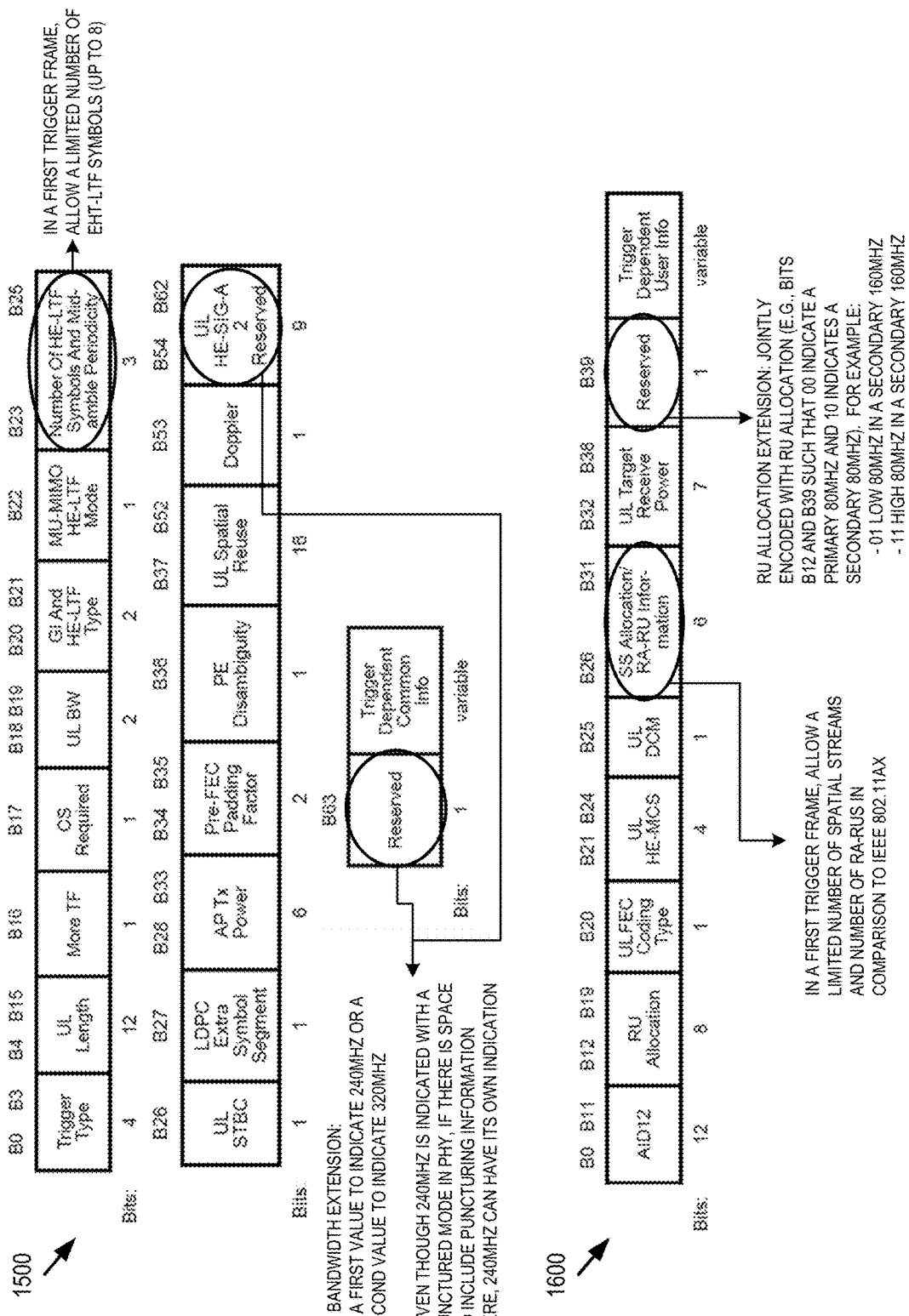
FIG. 18 shows bandwidth signaling using a set of fields of a trigger frame, in accordance with some embodiments of the present disclosure.

For example, as shown in FIG. 18, one field (or several bits from existing fields) could be assigned to indicate a UL bandwidth extension. Here a first value could be set to 240 MHz and a second value could be set to 320 MHz. The number of spatial streams or the number of EHT-LTF symbols could be limited to up to eight for simplicity. In some embodiments, an RU allocation field could be reused to indicate a 160 MHz PPDU. In this case, the reserved field in the user information field 1600 could be used to indicate whether a low 160 MHz or a high 160 MHz is used (i.e., an RU allocation extension or RU extension field) when the PPDU is assigned to a 270 MHz or 320 MHz bandwidth. In some embodiments, the RU allocation field could indicate an aggregated RU (e.g., RU26+52, RU26+106) which is reinterpreted only for EHT STAs.

For example, one bit (A) (e.g., B12) from the RU allocation field could be jointly encoded with one bit (B) (e.g., B39) in the RU allocation extension. When assigned a 240 MHz or 320 MHz bandwidth, if AB is set to 00, this indicates that a primary 80 MHz is used; if AB is set to 10, this indicates a secondary 80 MHz is used; if AB is set to 01, this indicates that a low 80 MHz in a secondary 160 MHz is used; and if AB is set to 11, this indicates that a high 80 MHz in the secondary 160 MHz is used. In this fashion, HE STAs can still decode and properly interpret a corresponding trigger frame according to the IEEE 802.11ax standard but signaling can also be performed in relation to EHT STAs.

Figure 19:
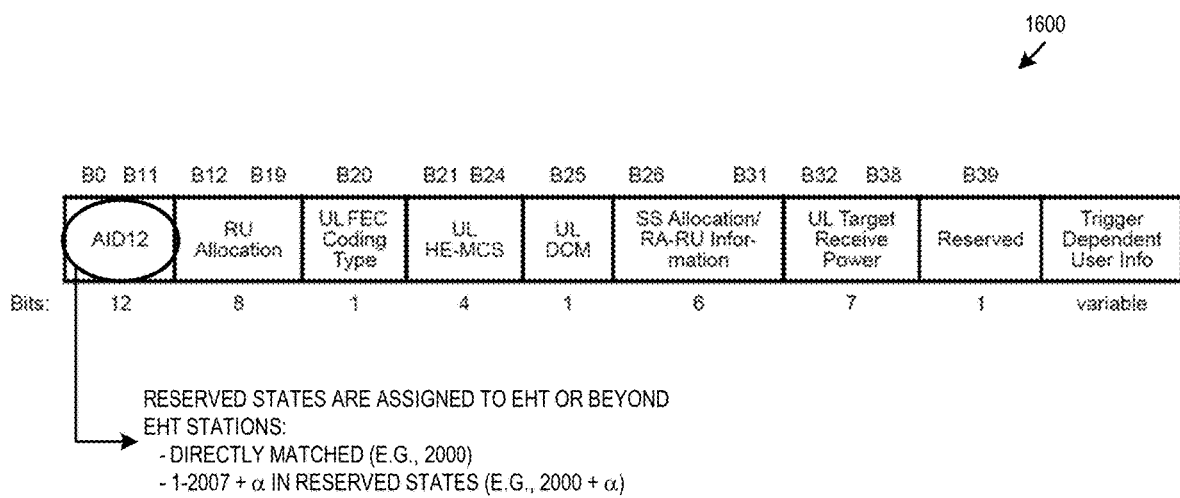
FIG. 19 shows an example for repurposing/reinterpreting an address field in a user information field for EHT or beyond EHT stations, in accordance with some embodiments of the present disclosure.

FIG. 19 shows an example for repurposing/reinterpreting the AID12 field in the user information field 1600 for EHT or beyond EHT STAs. In one embodiment, reserved states for the AID12 are assigned to EHT or beyond EHT STAs. For instance, as shown in FIG. 16 and FIG. 19, values from 2008 to 2044 or 2046 to 4094 could be assigned to EHT or beyond EHT STAs instead of HE STAs.

In some embodiments, some fields of a trigger frame could be reinterpreted only for EHT STAs to indicate different control information. For example, this control information could indicate a UL FEC coding type. In particular, assuming the basic units to support new features in EHT are 80 MHz, BCC coding and/or UL DCM are not likely to apply to sub-PPDUs for EHT STAs. Accordingly, these corresponding values in a UL FEC coding type field could be jointly encoded to indicate additional or extended functions/features only for EHT or beyond EHT STAs.

Figure 20:
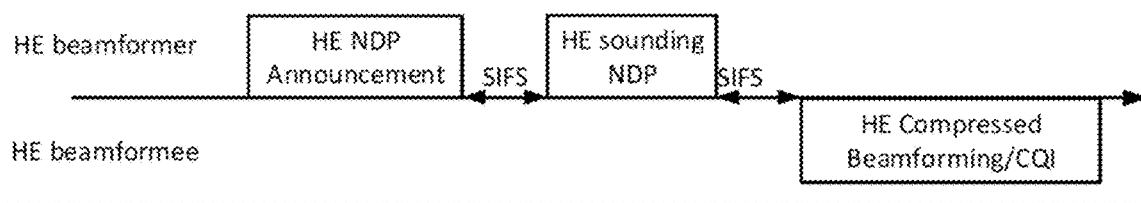
FIG. 20 shows a frame exchange sequences for SU-multiple input multiple output (MIMO), in accordance with some embodiments of the present disclosure.
Figure 21:
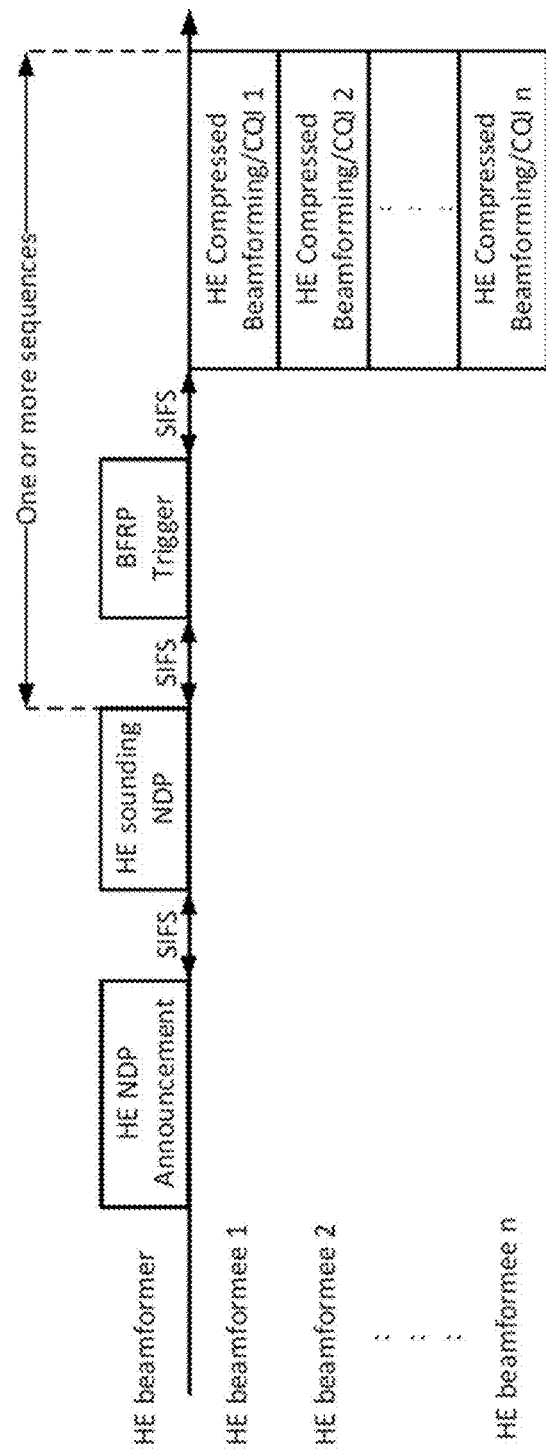
FIG. 21 shows a frame exchange sequences for MU-MIMO, in accordance with some embodiments of the present disclosure.

In IEEE 802.11ax, frame exchange sequences for SU-MIMO and MU-MIMO are shown in FIG. 20 and FIG. 21, respectively. In the SU-MIMO frame exchange sequence of FIG. 20, an NDP is a null data packet and CQI is a channel quality indicator. In the MU-MIMO frame exchange sequence of FIG. 21, BFRP is a beamforming report poll.

In some embodiments, a beamformed transmission is initiated with an HE NDP announcement (NDPA) frame. After a SIFS interval an HE NDP frame is sent for the beamformee(s) to estimate a channel matrix and calculate a beam matrix. In a SU-MIMO frame exchange, an HE compressed beamforming/CQI frame, including feedback information, is sent by the beamformee(s). On the other hand, in an MU-MIMO frame exchange, a BFRP trigger frame is followed by HE compressed beamforming/CQI frames from multiple beamformees. This exchange can occur one or more times until all feedback information is fed back/received.

Figure 22:
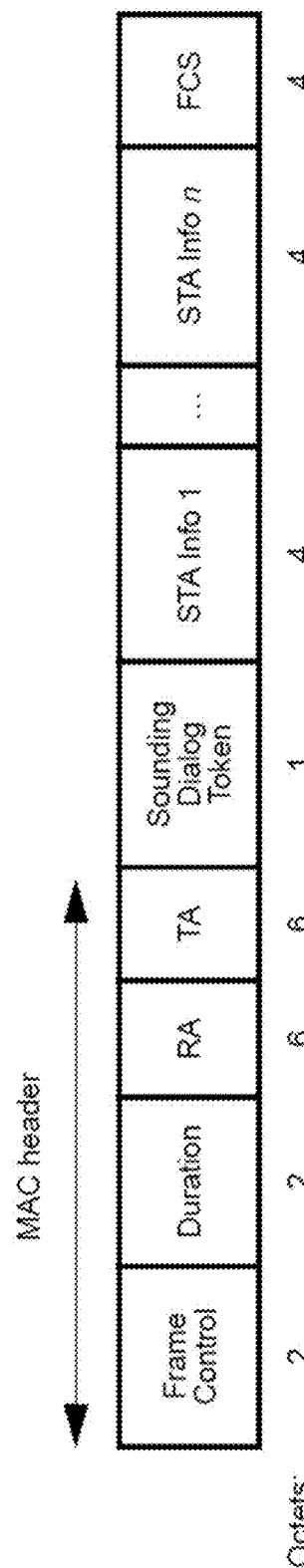
FIG. 22 shows an HE null data packet (NDP) announcement frame format that may be used by HE STAs but can also be repurposed for EHT STAs and beyond EHT STAs, in accordance with some embodiments of the present disclosure.
Figure 23:
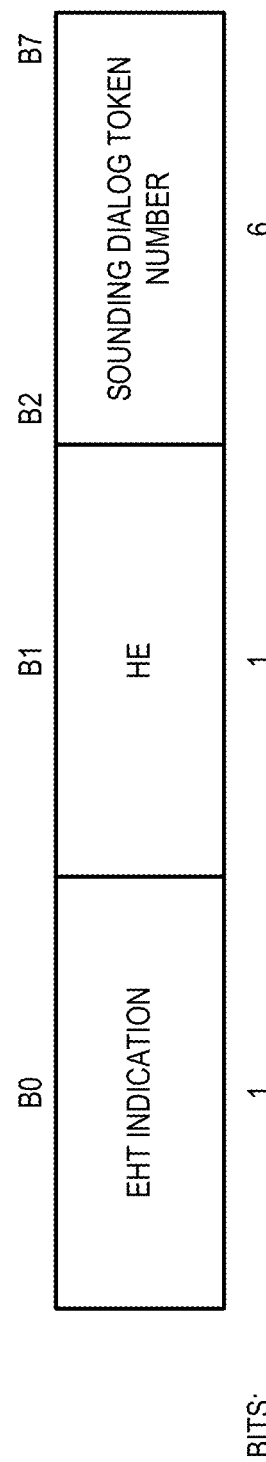
FIG. 23 shows a sounding dialog token field, in accordance with some embodiments of the present disclosure.

FIG. 22 shows an HE NDP announcement frame format that may be used by HE STAs but can also be repurposed for EHT STAs and beyond EHT STAs. The sounding dialog token field from FIG. 22 can be modified as shown in FIG. 23. In particular, to indicate a new type of NDP announcement frame for multiplexing different amendment STAs in a single uplink transmission, the bit B0, which is reserved in an HE NDP announcement frame, can be used as an EHT indication bit to indicate a new type of NDP announcement frame, which can be used for EHT STAs and/or beyond EHT STAs. In some embodiments, bits B2-B7 are a sounding dialog token number field, which contains a value selected by the beamformer to identify the NDP announcement frame. In this configuration, the combination of bits B0 and B1 can indicate four different NDP announcement frames according to the table in FIG. 24.

In one embodiment, two types of EHT NDP announcement frames can be indicated in these announcement frames, as shown in the table of FIG. 24. In particular, a first EHT NDP announcement (NDPA) frame contains the same fields (or subfields) defined for an HE NDP announcement frame, such that the frame can be transparent/interpreted by HE STAs based on a value of B1 regardless of a value of B0. However, EHT STAs can reinterpret some fields of these NDP announcement frames for its own purposes. The first EHT NDPA could be used when HE STAs are assigned on a primary 80 MHz and EHT STAs are assigned on secondary channels. The second EHT NDPA could contain additional information to cover new features supported by EHT STAs or beyond EHT STAs (e.g., up to 16 spatial streams or 320 MHz channel bandwidths) with different sizes of fields only for EHT or beyond EHT STAs.

Figure 25:
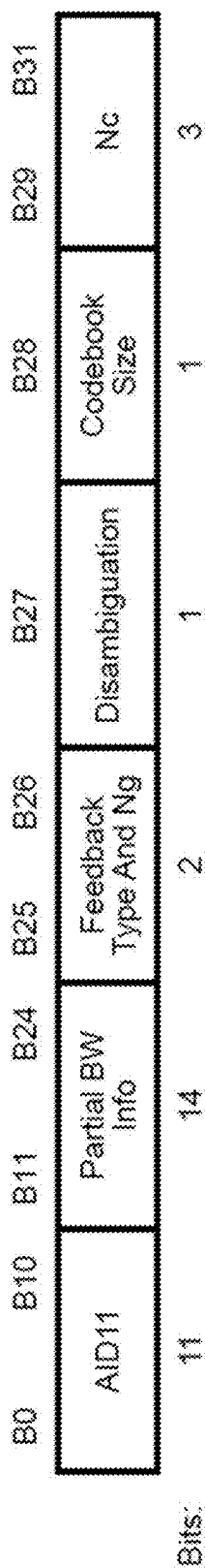
FIG. 25 shows station information subfield for an NDP announcement frame, in accordance with some embodiments of the present disclosure.

In terms of HE STAs, when B1 indicates 1, HE STAs receive a STA information subfield as shown in FIG. 25. In particular, FIG. 25 shows a STA information subfield format in an HE NDP announcement frame if the AID11 subfield is not 2047.

Figure 26:
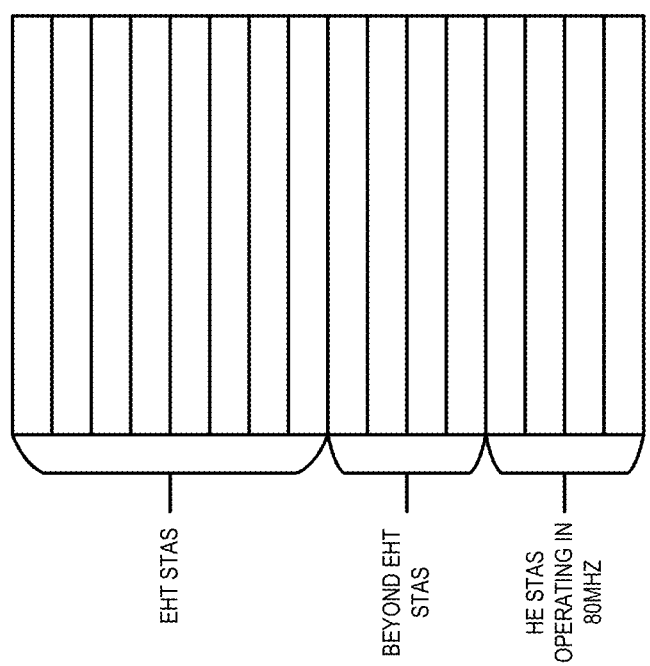
FIG. 26 shows station assignment based on type of station, in accordance with some embodiments of the present disclosure.

In terms of HE STAs, when B0B1 indicate the value of 11, HE STAs receive a STA information subfield in which the length of STA information subfield is four bytes. When the size of the STA information field is consistent in size, contents in the partial bandwidth information subfield could be differently interpreted by EHT or beyond EHT STAs. For example, the minimum RU size could be 20 MHz and/or the partial bandwidth information subfield could include a disallowed subchannel bitmap. Depending on the size, remaining parts of the partial bandwidth information subfield could be reserved. For example, HE STAs are assigned to a primary 80 MHz while EHT STAs are assigned to secondary channels (e.g., with a remaining 240 MHz) as shown in FIG. 26. The partial bandwidth information subfield consists of or otherwise includes 12 bits of disallowed subchannel bitmap information to cover 240 MHz and 2 reserved bits.

The partial bandwidth information subfield could represent a bitmap to signal punctured feedback information. In particular, a 9-bit bitmap (e.g., bits B0-B8) could be assigned for this purpose, where B0 indicates resolution whether it is 20 MHz (a first size) or 40 MHz (a second size). For instance, B0 is set to 0 (a first value) for a 20 MHz resolution for a PPDU bandwidth of an NDP that is smaller than 320 MHz (e.g., 20/40/80/160 MHz for EHT STAs) and B1-B8 each represent a 20 MHz subchannel. For example, FIG. 27 shows a partial bandwidth information subfield based on a 20 MHz/242-tone resolution per resource unit.

For instance, B0 is set to 1 (a second value) for a 40 MHz resolution for a PPDU bandwidth of an NDP that is smaller than 320 MHz (e.g., 320 MHz for EHT STAs) and B1-B8 each represent a 40 MHz subchannel. For example, FIG. 28 shows a partial bandwidth information subfield based on a 40 MHz/484-tone resolution per resource unit.

However, B0 could be indicated implicitly with a value in a PPDU bandwidth field in an NDP, where an NDPA is followed by an NDP. Depending on the value, STAs for each STA information field assigned in an NDPA can interpret which subchannels should be measured to feedback the required information given by the NDPA. In this case, one bit may be saved for other purposes. In one embodiment, if the value in the PPDU bandwidth field of an NDP indicates 20/40/80/160 MHz, B1-B8 each represent a 20 MHz subchannel. For example, FIG. 29 shows a partial bandwidth information subfield based on a 20 MHz/242-tone resolution per resource unit. In one embodiment, if the value in the PPDU bandwidth field of an NDP indicates 320 MHz, B1-B8 each represent a 40 MHz subchannel. For example, FIG. 30 shows a partial bandwidth information subfield based on a 40 MHz/484-tone resolution per resource unit.

Figure 31:
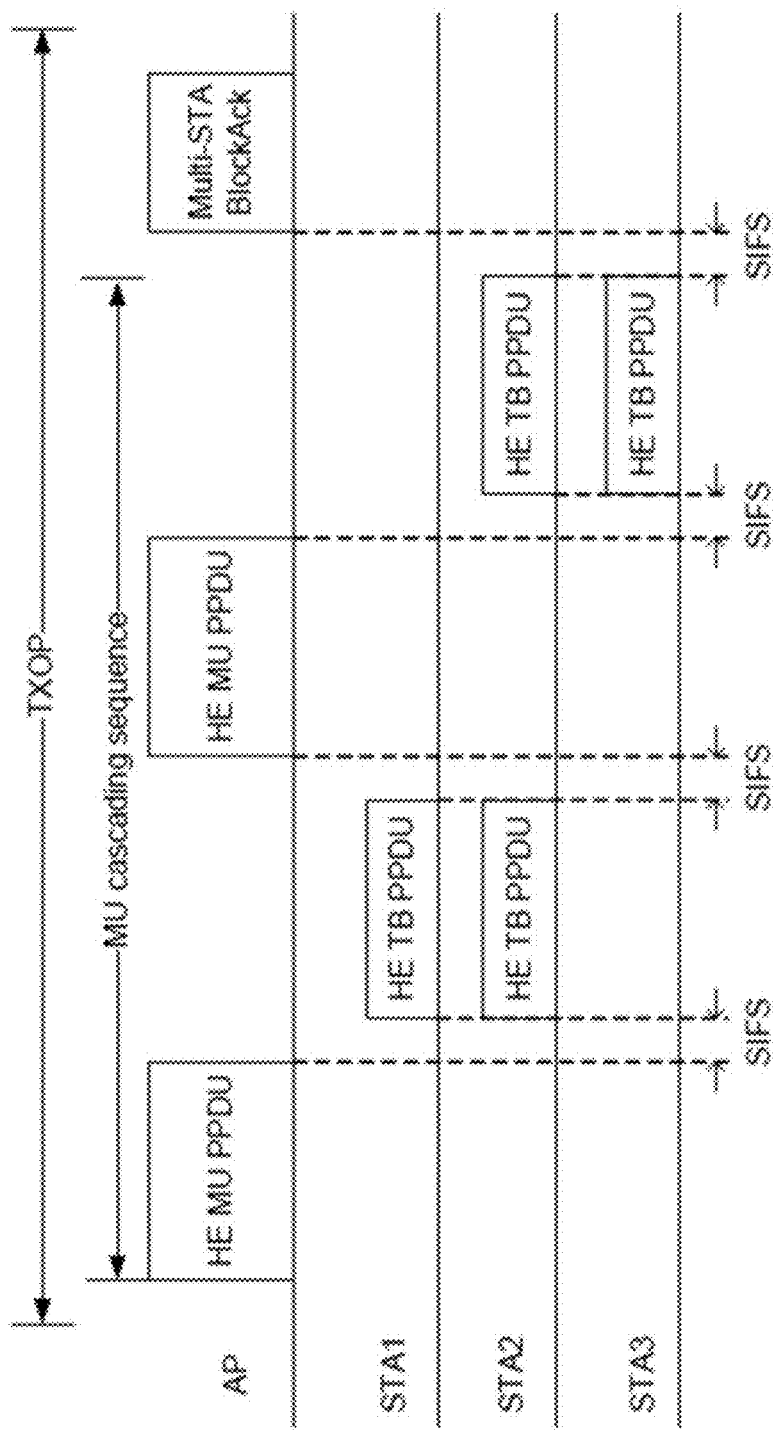
FIG. 31 shows cascading transmissions involving downlink/uplink MU transmissions within a transmission opportunity, in accordance with some embodiments of the present disclosure.

IEEE 802.11ax supports not only DL MU transmissions but also UL MU transmissions. UL trigger-based (TB) PPDUs (e.g., MU-MIMO and/or OFDMA) are sent as a response to a trigger frame transmitted by the AP. On top of this trigger frame, efficient multiplexing acknowledgement transmissions in response to DL/UL MU PPDUs are highly likely to be involved in this mechanism. Allowing for cascading transmissions involving DL/UL MU transmissions within a TXOP, as shown in FIG. 31, AP/STAs may have chances to exchange different types of frames efficiently and quickly to support MU transmissions. With this cascading operation, different trigger frames may assign different sets of STAs, such as a 1st group of STAs with STA1 and STA2 and a 2nd group of STAs with STA3 and STA4. Each group may include some overlapping STAs.

If acknowledgement frames are required to be a response to STAs, which received a DL OFDMA frame, OFDMA acknowledgement frames as an immediate response can be an efficient way to reduce overhead. With limited information for acknowledgement scheduling, a compressed trigger frame can be fit into an A-control frame.

Figure 33:
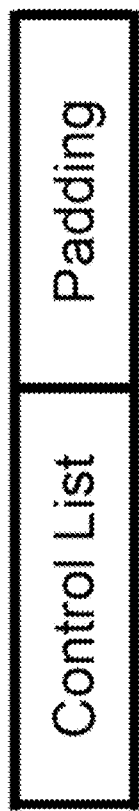
FIG. 33 shows the A-control subfield format of the HE A-Control frame, in accordance with some embodiments of the present disclosure.
Figure 34:
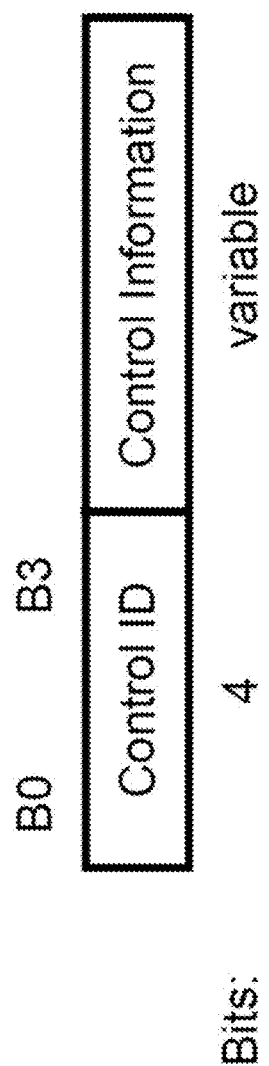
FIG. 34 shows a control subfield format for the A-control subfield, in accordance with some embodiments of the present disclosure.

FIG. 32 shows an HE A-Control frame format in a MAC header. FIG. 33 shows the A-control subfield format of the HE A-Control frame and FIG. 34 shows a control subfield format for the A-control subfield. In this configuration, the control ID subfield identifies control information. An end of HE (EOH) indication in an HE control field indicates whether another HE control field follows. An aggregated control (A-control) subfield consists of or otherwise includes a control list and padding subfields and the total number of bits for these subfields is 30 bits. The control list subfield in an A-control subfield that contains one or more control subfields. The control ID subfield indicates the type of information carried in the control information subfield. The values of the control ID subfield and the associated length of the control information subfield may be defined according to FIG. 35.

Figure 36:
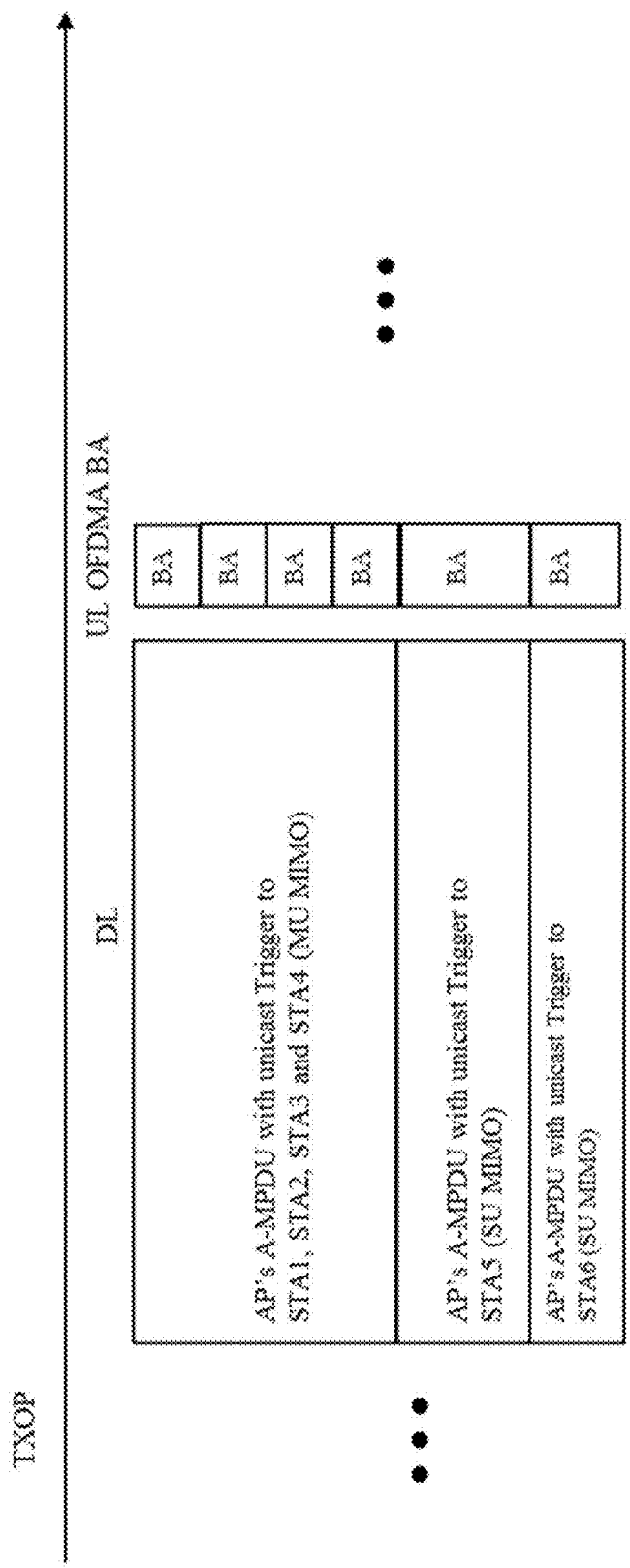
FIG. 36 shows use of triggered response scheduling, in accordance with some embodiments of the present disclosure.

Using triggered response scheduling (TRS), as shown in FIG. 36, if acknowledgement frames are required for STAs that received a DL OFDMA frame, OFDMA acknowledgement as an immediate response can be an efficient way to reduce overhead. In order to schedule and solicit acknowledgements, some information, such as common and STA/user specific information, may not be needed when compared to a trigger frame soliciting UL MU data frames. With limited information to be helpful only for acknowledgement scheduling, a compressed trigger frame can fit into an A-control frame.

Figure 37:
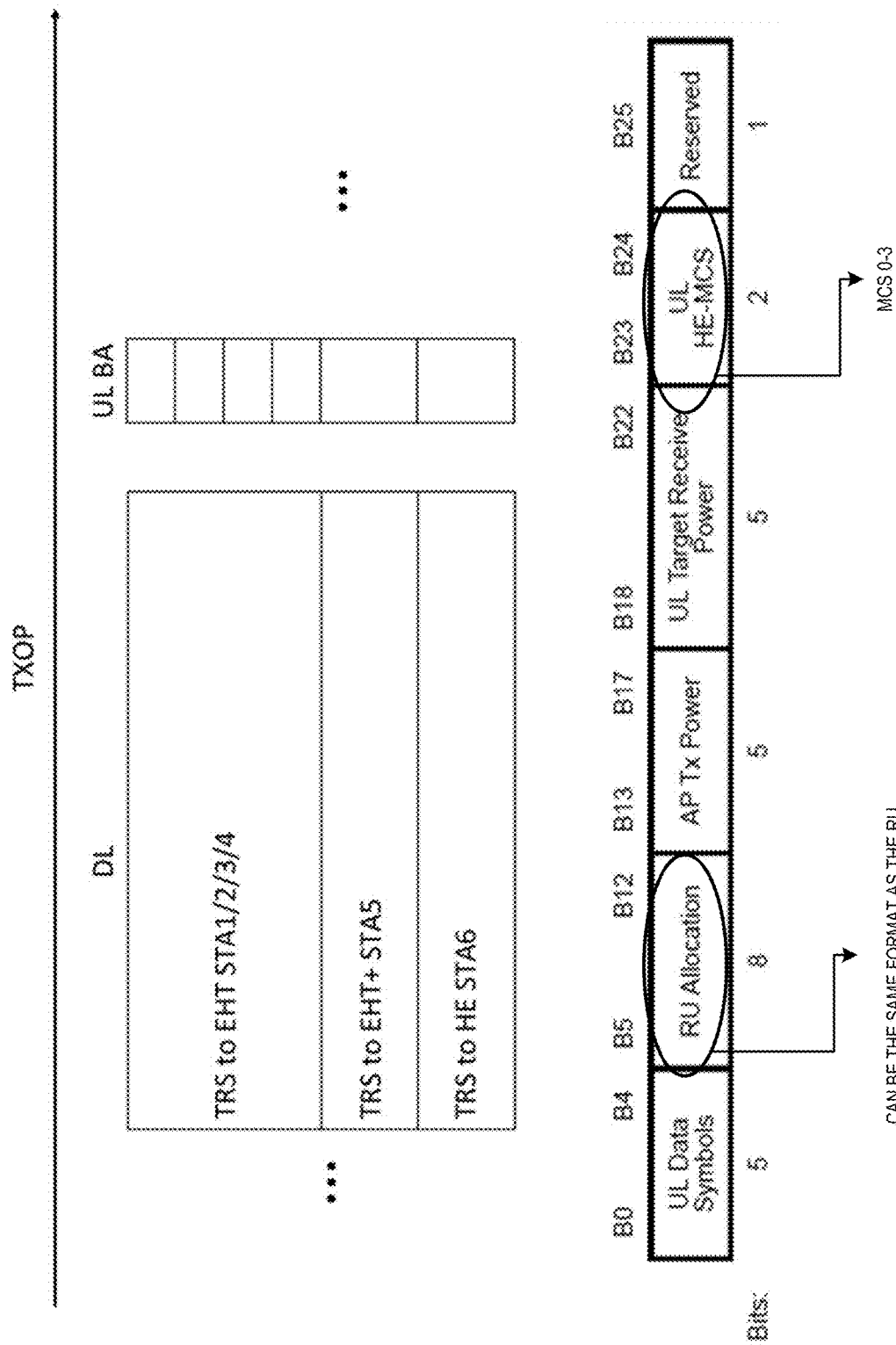
FIG. 37 shows a control subfield for a triggered response scheduling field, in accordance with some embodiments of the present disclosure.

TRS control field in an A-control frame could be used to support multiplexing different amendment devices, wherein the TRS control field is transparent to or otherwise interpretable by HE STAs. The control information subfield in a TRS control subfield contains triggered response scheduling (TRS) information for soliciting an HE TB PPDU that follows an HE MU PPDU, HE SU PPDU, or HE ER SU PPDU carrying the control subfield shown in FIG. 37. In some embodiments, a new control ID could be used to distinguish between an HE trigger frame and an EHT or beyond EHT trigger frame.

In one embodiment, an A-control frame includes a control information subfield according to one or more of: (1) an RU allocation field that consists of or otherwise includes the values defined in IEEE 802.11ax and new values for aggregated RUs (26+52RU, 26+106RU, or 242+484RU) at reserved states; (2) a reserved bit could be used for an RU allocation extension where it is jointly encoded with 8 bits of an RU Allocation subfield for further combination for EHT STAs; (3) a CH_BANDWIDTH parameter that is set to the value of the RXVECTOR parameter CH_BANDWIDTH of the soliciting DL EHT PPDU (no additional bits are required to indicate a wider channel bandwidth); (4) a NUM_HE_LTF parameter is set to 1; (5) an FEC_CODING parameter is set to 0 if the RU allocation subfield indicates an RU that is smaller than a 484-tone RU and otherwise is set to 1; (5) if LDPC is allowed based on a restriction (e.g., a minimum multiplexing unit is 80 MHz over multiple 80 MHz subchannels), the FEC_CODING parameter is set to 1; and (6) if the RXVECTOR parameters EHT_LTF_TYPE and GI_TYPE of an EHT MU PPDU carrying the frame with a TRS control subfield are either 4× EHT-LTF and 3.2us_GI, respectively, or 2× EHT-LTF and 1.6us_GI, respectively, then the EHT_LTF_TYPE and GI_TYPE parameters are set to 4× EHT-LTF and 3.2us_GI, respectively, otherwise, the EHT_LTF_TYPE and GI_TYPE parameters are set to 2× EHT-LTF and 1.6us_GI, respectively.

Figure 38:
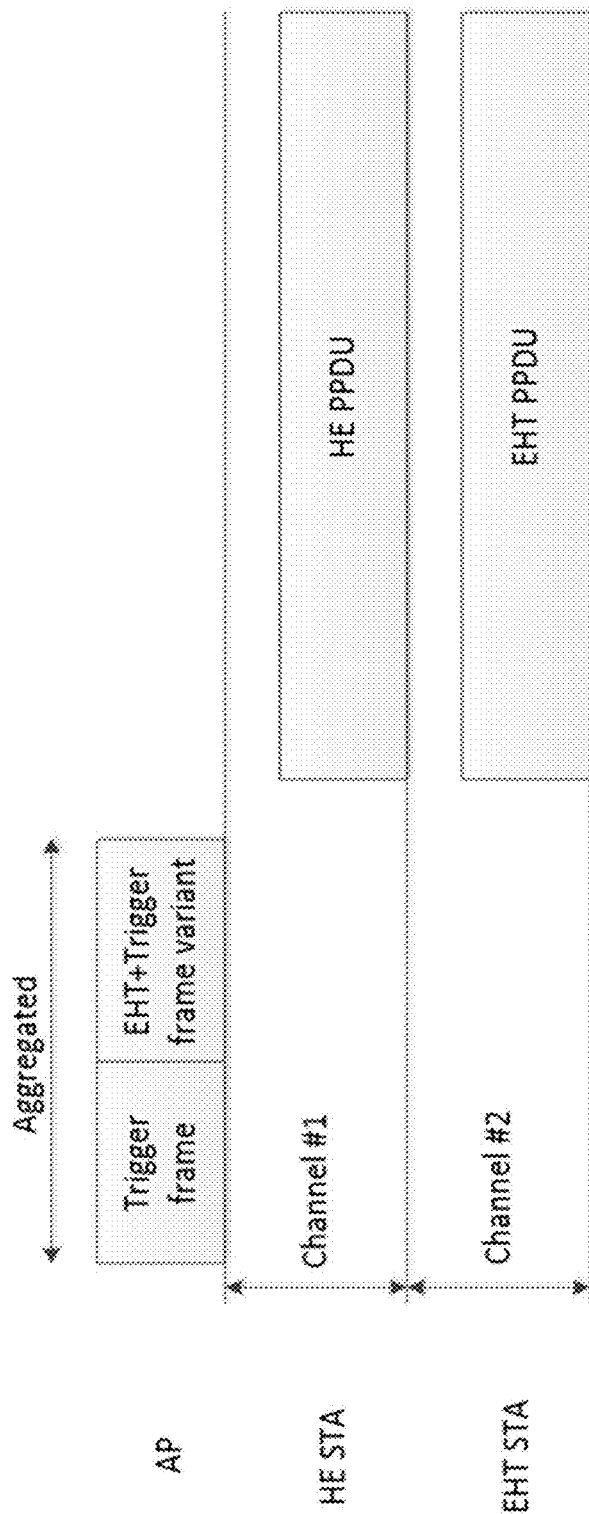
FIG. 38 shows an enhanced trigger frame that could be designed for HE, EHT, and beyond EHT stations, in accordance with some embodiments of the present disclosure.

In some embodiments, additional methods for enhanced trigger frames may be used to support HE, EHT, or beyond EHT STAs to respond in an UL transmission together. In one embodiment, an enhanced trigger frame could be designed for HE, EHT, and beyond EHT STAs, as shown in FIG. 38. The HE trigger and EHT (or beyond EHT) trigger variant can be aggregated and transmitted to trigger on a single PPDU frame at the same time.

To support this method, a trigger type subfield encoding can be used. For example, a 4-bit trigger type subfield can be defined in a trigger frame according to the table of FIG. 39. In this configuration, a most significant bit (MSB) of the trigger type subfield is reserved. To indicate a new trigger frame, the MSB is used as an indication such that 0 indicates a HE trigger frame and 1 indicates an EHT or beyond EHT trigger frame. In some embodiments, values 9-15 can be used to define one of further subtypes with one state. This aggregated design with a newly defined trigger type subfield allows the rest of the common information field and user information field to be redefined to carry new information, such as extended bandwidth information.

Figure 40:
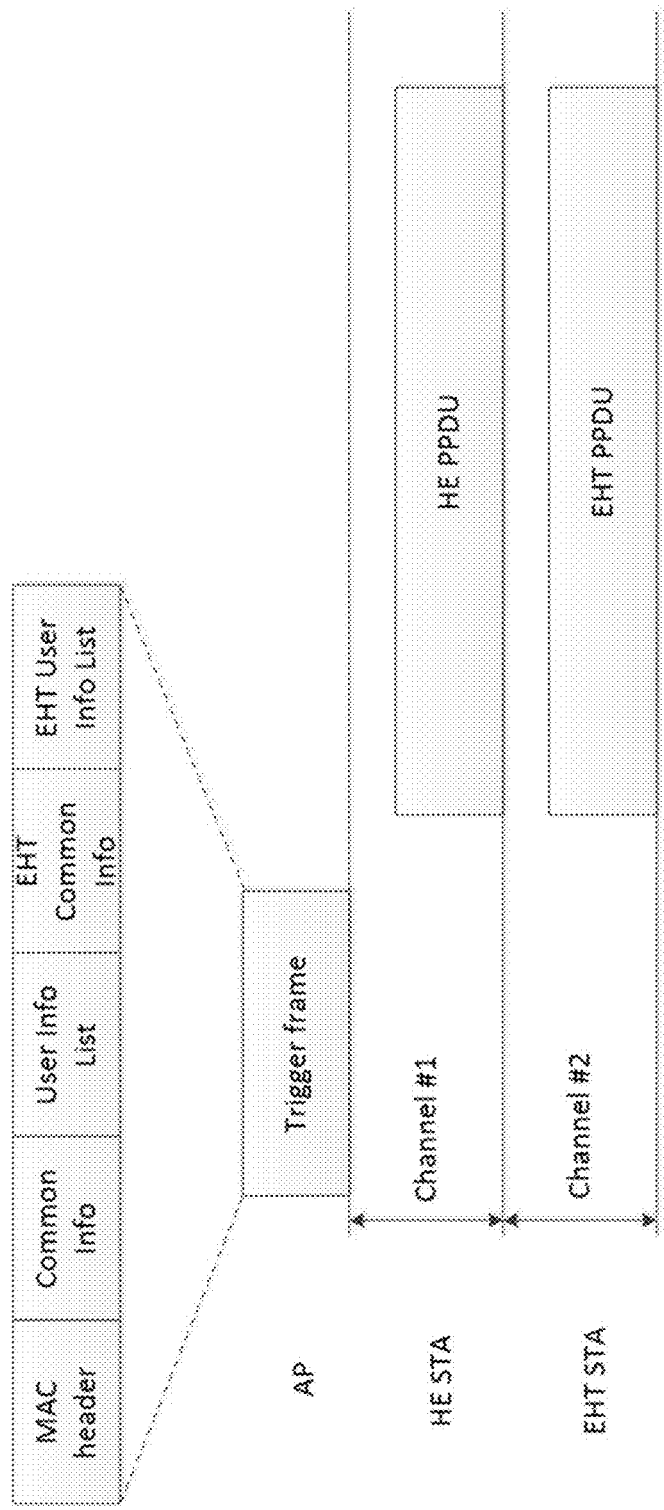
FIG. 40 shows an enhanced trigger frame that could be designed for HE, EHT, and beyond EHT stations, in accordance with some embodiments of the present disclosure.

In some embodiments, an enhanced trigger frame could be designed for HE, EHT, and beyond EHT STAs, as shown in FIG. 40. In these embodiments, corresponding information for HE, EHT, and beyond EHT can be combined to trigger a single PPDU frame at the same time.

Figure 41:
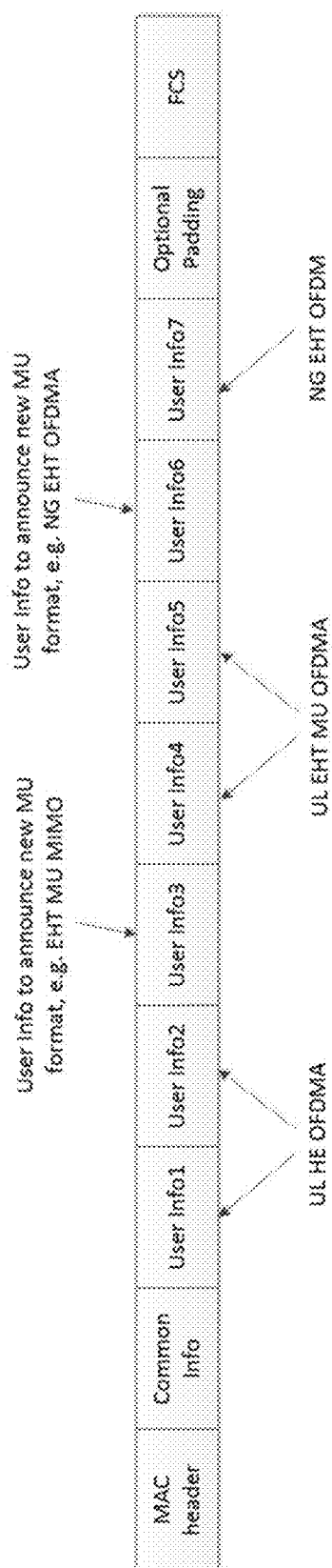
FIG. 41 shows a user information field, in accordance with some embodiments of the present disclosure.

For example, as shown in FIG. 41, a user information field with a specific AID value in an AID12 field can announce a specific PPDU format (e.g., one of HE/EHT/EHT+ TB (OFDMA or MU MIMO) or SU PPDU formats). Based on this, other additional information can also be announced (e.g., bandwidths more than 160 MHz and/or a 20 MHz channel bitmap that indicates available 20 MHz channel for puncturing operation). User information fields with an announced same format can be appended until a new user information field with a different specific AID value in the AID12 field is announced as shown in FIG. 41. The HE format can be announced explicitly or can be announced by default (e.g., the user information fields immediately following the common user information field without any announcement).

To carry additional common information and user specific information for EHT or beyond EHT STAs, a new common information field and user information field can be defined. For example, FIG. 42 shows a new common information field and user information field, according to some embodiments. In particular, option #1 shows a common information field to announce a new format (e.g., an EHT format), where one of the reserved AID values (e.g., 2008-2044) is assigned for EHT or a beyond EHT common information field. EHT STAs will recognize the user information field with this reserved AID, where EHT STAs obtain EHT-specific common information from while HE STAs ignore this field. Option #2 shows an additional/EHT AID field, which specifies an EHT STA to indicate this user information field is dedicated to a specific receiver. A reserved AID in option #1 and option #2 could be different to indicate whether it is a common information field or not. A reserved AID for different amendment/standard devices (e.g., EHT and beyond EHT) may be different as defined for EHT. To support backward compatibility with HE STAs, the length of the user information fields for both option #1 and option #2 may be the same as an HE user information field (e.g., 5 bytes) or its length may be in units of length of an HE user information field, including a dependent user information subfield, whose length could be dependent on its trigger frame type.

FIG. 43 shows another method for an advanced trigger frame described herein. As shown, the trigger frame contains one user information field with an AID of 4095. Accordingly, HE STAs will not decode after recognizing AID 4095 because HE STAs interpret the following user information fields as a padding field while EHT STAs shall decode EHT specific information from these user information fields with an AID 4095.

Assuming an enhanced trigger frame is transparent to HE STAs such that HE TB PPDUs can still be transmitted by these HE STAs in response to the enhanced trigger frame, there is additional information that can be carried in reserved bits of a common information field of the HE trigger frame for EHT or beyond EHT STAs, which are to jointly participate with HE STAs in an uplink transmission. For example, a first set of reserved bits (e.g., one or more bits) could indicate whether the trigger frame is an enhanced trigger frame. A second set of reserved bits (e.g., one or more bits) could indicate a value of a PHY version field to be copied to a U-SIG field in a TB PPDU. In this case, the PHY version field identifies the PPDU version (e.g., HE, EHT, or beyond EHT PPDU). A third set of reserved bits (e.g., one or more bits) could indicate a value of a PPDU type field to be copied to a U-SIG field in a TB PPDU. In this case, the PPDU type field identifies whether the PPDU is a TB PPDU or a SU/MU PPDU.

In some embodiments, the UL HE SIG-A2 reserved field in a common information field of an HE trigger frame and can be redefined to carry more common information for an enhanced trigger frame. Alternatively, or in addition, a user information field with a specific AID value in an AID12 field can announce that the user information field carries more common information for an enhanced trigger frame. The common information can be divided into two groups: trigger-based type independent common information and trigger-based type dependent common information. For example, the trigger-based type independent common information can include (1) an uplink length, which indicates a length of a responding PPDU, (2) a more trigger frame indication, which indicates whether or not a subsequent trigger frame is scheduled for transmission, (3) a carrier sensing required indication, which indicates whether energy detection is to be used to sense the medium and to consider the medium state and the NAV in determining whether or not to respond, (4) an uplink bandwidth indication, which indicates an uplink bandwidth, (5) an AP transmission power indication, which indicates the AP's combined transmit power at the transmit antenna connector of all the antennas used to transmit the triggering PPDU, and/or (6) an uplink spatial reuse indication, which indicates spatial reuse information for the trigger-based PPDU. Additionally, the trigger-based type dependent common information can include (1) a trigger-based type and/or (2) a channel bitmap that announces available 20 MHz channels for puncture operation.

In some embodiments, the UL HE SIG-A2 reserved field in a common information field of an HE trigger frame can be redefined to carry further information for EHT STAs and beyond EHT STAs. In these embodiments, these reserved bits may indicate the redesigned B54-B62 bits of the common information field. For example, one bit (e.g., bit B54 can be used as a further common information indication field) is always set to 0 for indicating additional common information. The further common information (e.g., bits B55-B62) can indicate: (1) a TB PPDU type and/or (2) an additional BW indication. For example, in an HE trigger frame, the reserved bits B54-B62 are set to is as default values. HE STAs ignore these reserved bits and EHT and beyond EHT STAs can consider this frame as a trigger frame designed only for HE STAs when set to all 1s. However, when bit B52 is set to 0, while HE STAs still ignore these reserved bits, EHT and beyond EHT STAs regard the frame as an enhanced trigger frame, which provides meaningful information on what EHT and beyond EHT STAs can do to respond in a UL transmission. For example, the features dedicated to EHT and beyond EHT STAs can be carried over bits B55-B62.

To allow for different types of STAs to respond with its own type of TB PPDUs in a UL transmission, a user information field could carry the information that indicates a new type of user information field that consists of or otherwise includes optimized fields assigned for EHT and beyond EHT STAs and are transparent to HE STAs. For example, this information could be a one bit HE/EHT format field, such that if the value is set to 0, the user information field is not changed for an HE TB PPDU while if the value is set to 1, the enhanced user information field is defined for EHT TB PPDU.

Considering only two TB PPDU versions (e.g., an HE TB PPDU and an EHT or beyond EHT TB PPDU) to respond to an enhanced trigger frame, it might be enough to only include a PHY version field to be copied to a U-SIG field in an EHT or beyond EHT TB PPDU and HE/EHT or HE/EHT+ format field to be set depending on the TB PPDU type. For example, a PHY version field may be set to indicate EHT and (1) an HE/EHT field is set to indicate HE or (2) an HE/EHT field is set to indicate EHT, depending on the user information fields. In this case, the HE TB PPDUs and the EHT TB PPDUs are transmitted in response to the enhanced trigger frame. In another example, a PHY version field is set to indicate a beyond EHT version and (2) an HE/EHT+ field is set to indicate HE or (2) an HE/EHT+ field is set to indicate EHT+, depending on the user information fields. In this case, the HE TB PPDUs and EHT+ TB PPDUs are transmitted in response to an enhanced trigger frame. Herein, an HE/EHT field or an HE/EHT+ field in a user information field could be interpreted depending on a PHY version field. This operation may provide power consumption benefits. With different versions of STAs mixed in a coverage area, such as HE, EHT and EHT+ STAs, once a PHY version field indicates EHT, EHT+ devices stop decoding the remainder of an enhanced trigger frame. Similarly, once a PHY version field indicates EHT+, EHT devices stop decoding the remainder of an enhanced trigger frame.

Figure 44:
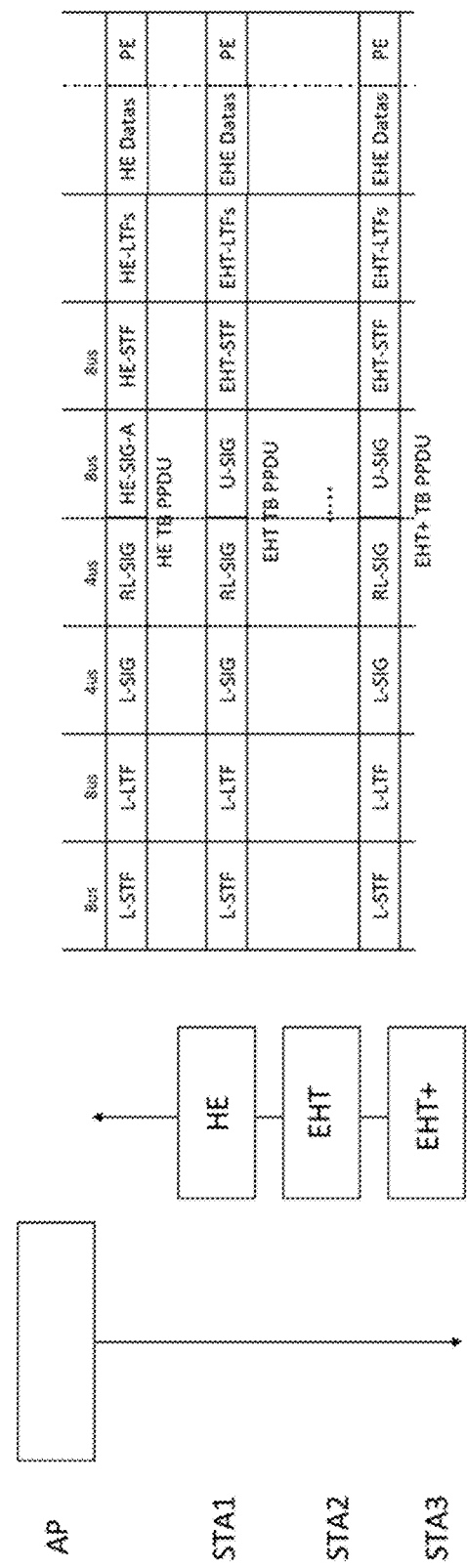
FIG. 44 shows multiple PPDU versions in an aggregated PPDU, in accordance with some embodiments of the present disclosure.

However, to support more than two different PPDU versions, as shown in FIG. 44, the methods previously mentioned may not function properly. A potential issue is that a PHY version field being copied to a U-SIG field in a TB PPDU, with the same value indicated as a common information field, which is likely to fix the TB PPDU version. For example, a PHY version field is set to EHT, then all the information in the U-SIG corresponds to an EHT TB PPDU with EHT preamble.

One technique to address this issue is to interpret the PHY version field differently in an enhanced trigger frame. For example, even though the PHY version field may indicate EHT+, this can be interpreted by a receiving STA to mean up to an EHT+ version, such as HE, EHT, and EHT+ TB PPDUs.

Another technique to address this issue is to have a value in the PHY version field to indicate that type information is located in each user information field. The use of this value is limited to the case in which PPDU type is set to TB PPDU and a UL/DL indication is set to UL.

Another technique to address this issue is to have a value in the PHY version field to indicate that different formats of TB PPDUs are combined in response to enhanced Trigger frame. The type information can be located in each user information field. The use of this value is limited to the case in which PPDU type is set to TB PPDU and a UL/DL indication is set to UL.

Figure 45:
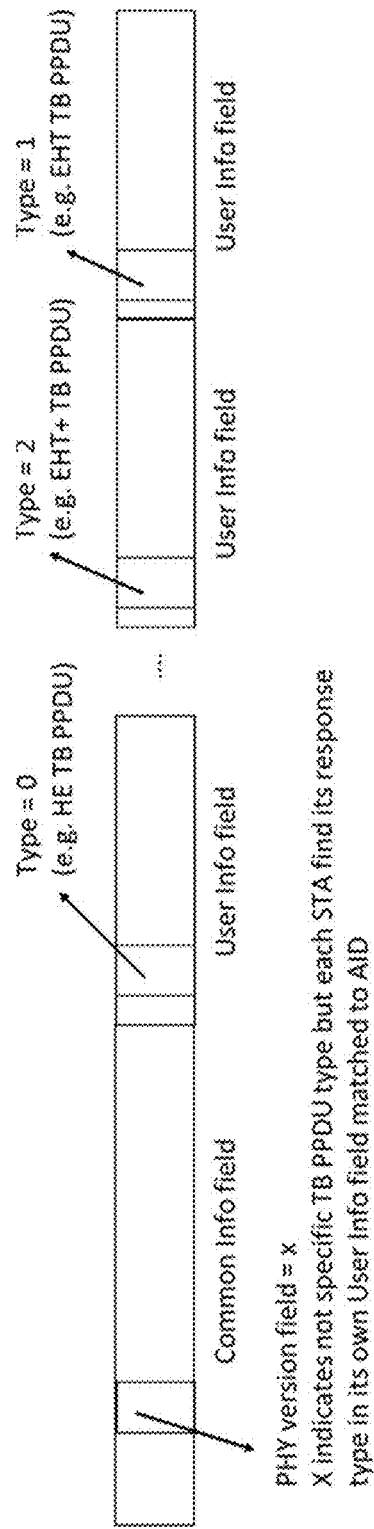
FIG. 45 shows another enhanced trigger frame, in accordance with some embodiments of the present disclosure.

In the three techniques outlined above, a TB PPDU version would be eventually determined when each STA located a matched AID in a AID12 field in a user information field containing a format type field as shown in enhanced trigger frame of FIG. 45. Depending on a value of the format type field, newly defined information in a common information field and a user information field of an enhanced trigger frame can be differently interpreted by each assigned STA.

One method is that a one bit HE/EHT format field could be jointly encoded with more reserved bits (e.g., Bx bits) in a user information field when a PHY version field indicates a beyond EHT version. A value of bit B39 could be fixed for HE STAs with 0 to ignore the value predefined for HE STAs as shown in the table of FIG. 46.

In one embodiment, an ideal size for a TB PPDU version field is to be the same as a PHY version field in a U-SIG field. However, there may be a different number of reserved bits depending on certain conditions, such as whether the PPDU is part of an SU or MU transmission, as each condition requires different control information. In this case, depending on the certain condition, a number of permitted PPDU formats can be different. Assuming an SU transmission is likely to secure more reserved bits, this type of PPDU can allow the same number of different TB PPDU versions as a PHY version field, while since an MU transmission is likely to secure less reserved bits, this type of transmission can permit a comparatively smaller number of different TB PPDU versions.

Given different TB PPDU versions that are combined in response to an enhanced trigger frame, some features need to be set to the same mode. It could be the case when not all TB PPDU versions support the same features. For example, a midamble may be introduced as to support HE devices in high doppler circumstances. In case a next version of HE devices does not support midambles, the value of the midamble field is set to 0. In particular, a bit (e.g., B53) of a doppler field and related values in a number of HE-LTF symbols and midamble periodicity field can be defined when no doppler is indicated such that (1) 0 for 1 HE-LTF symbol, (2) 1 for 2 HE-LTF symbols, (3) 2 for 4 HE-LTF symbols, (4) 3 for 6 HE-LTF symbols, (5) 4 for 8 HE-LTF symbols, and (6) 5-7 is reserved.

Figure 47:
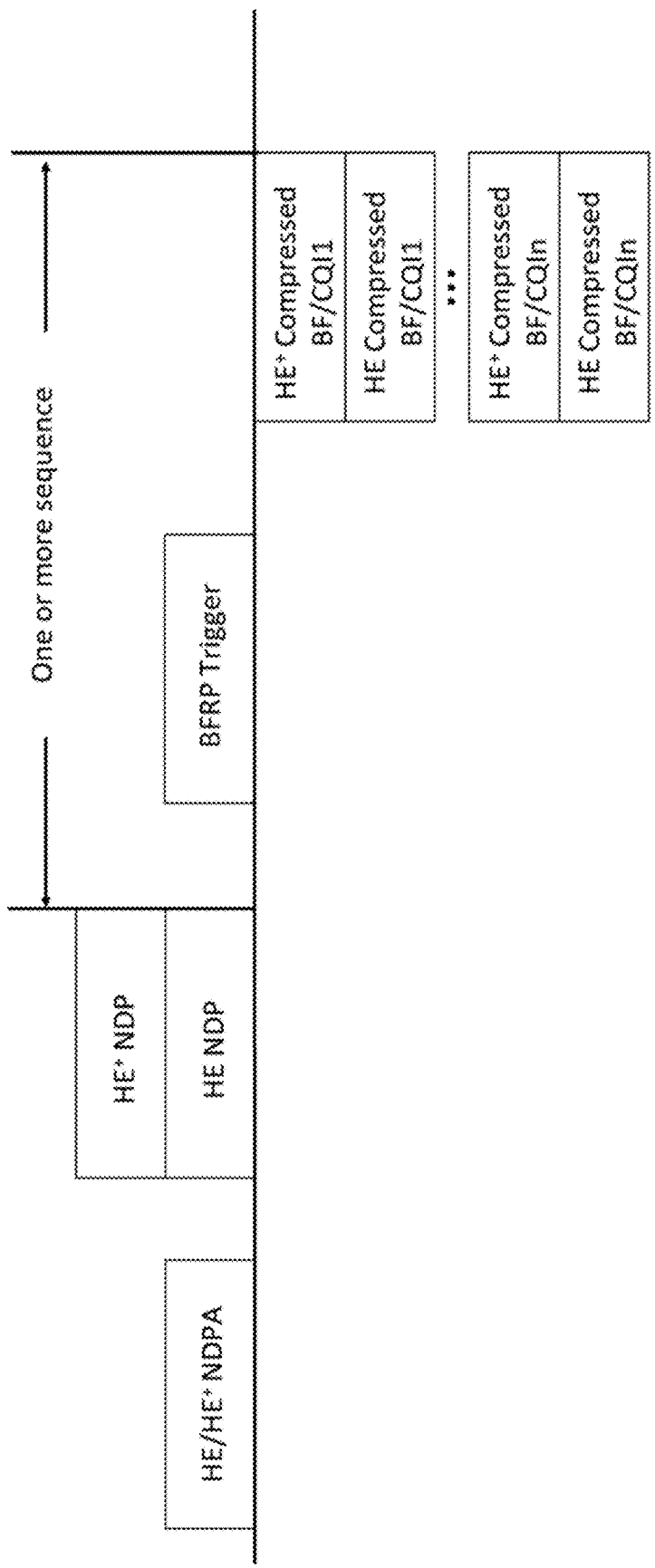
FIG. 47 shows a sounding procedure, in accordance with some embodiments of the present disclosure.

Considering a sounding procedure, including an NDP frame in an A-PPDU, as shown in FIG. 47, an HE NDP format and an HE+ NDP format (i.e., a beyond HE NDP, such as an EHT NDP or EHT+ NDP) could be combined to support an A-PPDU. In this case, the HE+ NDP format may consider some factors to be aligned with a combined different NDP format.

Figure 48:
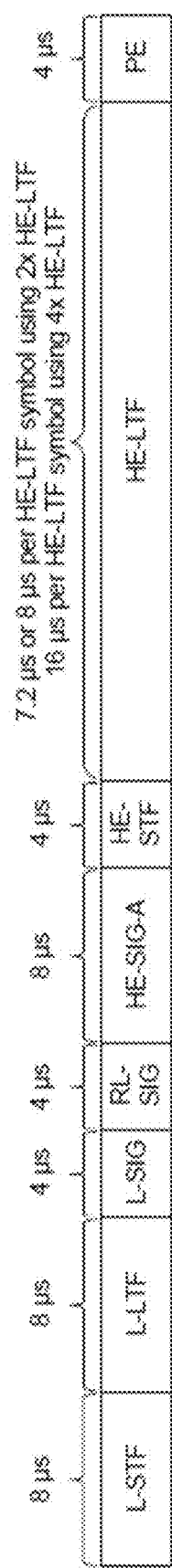
FIG. 48 shows an HE NDP frame format, in accordance with some embodiments of the present disclosure.

An HE NDP format is shown in FIG. 48, which may be used when HE and HE+ STAs are to respond in TB PPDUs together. The HE sounding NDP may have one or more of the following properties: (1) uses the HE SU PPDU format but without the data field and (2) has a packet extension field that is 4 μs in duration.

An HE sounding NDP overlapping the 242-tone RUs, corresponding to bits with a value of 1 in the bitmap of the TXVECTOR parameter INACTIVE_SUBCHANNELS or overlapping a punctured center 26-tone RU of an HE sounding NDP, are punctured. The center 26-tone RU of the HE sounding NDP is punctured if either one of the adjacent 242-tone RUs is punctured.

It may be mandatory to support the 2× HE-LTF with a 0.8 μs guard interval and a 2× HE-LTF with a 1.6 μs guard interval. It may be optional to support a 4× HE-LTF with a 3.2 µs guard interval. The other combinations of HE-LTF type and guard interval durations may be disallowed.

If the Beamformed field in a HE-SIG-A field of an HE sounding NDP is 1, then the receiver of the HE sounding NDP should not perform channel smoothing when generating the compressed beamforming feedback report.

There are some options for an NDP format for beyond HE devices. For option 1, shown in FIG. 49, the NDP format has the same format as an HE NDP format, which consists of or otherwise includes a two OFDM symbol U-SIG field instead of an HE-SIG-A field. For option 2, shown in FIG. 49, the NDP format has a longer NDP PPDU format due to an HE+-SIG field, which includes one or two OFDM symbols (extra 4 or 9 us) such that this NDP format is not aligned with an HE NDP format. Further, the duration of a packet extension $T_{PE}$ can be calculated according to several options. In one embodiment, $T_{PE}$ in a HE+ NDP may have a longer value, such as 8 us, which is double compared to 4 µs in a HE-NDP under certain conditions. For example, the conditions could include 1) a bandwidth greater than 160 MHz or 2) a NSTS (or a NSS with no STBC) greater than 8.

In a first option for a duration of a packet extension $T_{PE}$, when there are no extra SIG symbols, there is no issue to support combining different NDP formats in an A-PPDU for a TB sounding procedure. However, some possible values in the control fields of U-SIG and HE-SIG-A to ensure alignment. This limitation could be a number of HE (or HE+) LTF symbols of an A-PPDU that includes NDP PPDUs. This limitation on values could be for an LTF size and GI combination of an A-PPDU that includes NDP PPDUs. This limitation could be requiring the same $T_{PE}$, wherein 4 µs could be appended when NSTS is equal to or smaller than 8.

However, a second option can cover a new sounding procedure with an A-PPDU for EHT STAs. In a first case, HE STAs are to combine transmissions within TB PPDUs. In this case, only an HE NDP format is allowed, as shown in FIG. 47. HE STAs and EHT STAs (or more advanced STAs) anticipate an HE NDP frame after receiving an HE/HE+ NDPA during the sounding procedure.

To support this, one reserved bit (e.g., bit B14 in HE-SIGA1 or HE-SIGA2) in HE-SIG-A in an HE NDP could be jointly encoded with Nsts (e.g., NSTS and Midamble Periodicity) as shown in FIG. 50, where the doppler field is set to 0.

Assuming up to 16 space-time streams (without STBC, this refers to spatial streams) available in HE+ STAs and up to 8 space-time streams available in HE STAs respectively, the number of LTFs (e.g., HE LTFs and HE+ LTFs, which can be referred to as a first LTF and a second LTF, respectively) to be measured for beamforming feedback should be considered. To meet (the first and the second) LTF end time alignment in NDP PPDUs of an A-PPDU, there are some options. In some cases, more than one option could be properly selected and depending on the number of space-time streams for an HE STA and an HE+ STA to be combined in an A-PPDU.

A first option is to limit the max value of Nsts for HE+ STAs. For example, the max value could be 8. It could be indicated with a 3-bit Nsts field. It could be covered with a 4-bit Nsts field, wherein up to 8 space-time streams are allowed to be indicated. In this case, $T_{PE}$ could be set to 4 us.

A second option is that a duration of one LTF (e.g., the first LTF) for HE STAs is double a duration of one LTF (e.g., the second LTF) for HE+ STAs to meet LTF end time alignment. For example, if the number of space-time streams for an HE+ STA is indicated to be 16, the number of space-time streams for an HE STA should be indicated to be 8. To meet this condition, given the same GI, 2× LTF (or 1× LTF) for HE+ STAs and 4× LTF (or 2× LTF) for HE STAs should be indicated in each HE-SIG-A field in NDPs of an A-PPDU. Considering a 2× LTF with a 0.8 µs GI, a 2× LTF with a 1.6 µs GI and a 4× LTF with a 3.2 µs GI are allowed in an HE NDP PPDU, a 1× LTF with a 0.8 µs GI, a 1× LTF with a 1.6 µs GI, and a 2× LTF with a 3.2 µs GI could be indicated for HE+ STAs. In case the corresponding LTF size and GI is not supported for HE+ STAs in other PPDUs except for an NDP, the corresponding LTF size and GI could be used only for NDPs. For example, even though a 2× LTF and a 0.8 µs GI, a 2× LTF and a 1.6 µs GI, a 4× LTF and a 3.2 µs GI, and a 4× LTF and a 0.8 µs GI are allowed for an MU PPDU, a TB PPDU or other PPDUs for HE+ STAs, different values for an LTF size and a GI combination could be introduced only for NDPs of an A-PPDU.

A third option is that if the number of space time streams is more than 8 for HE+ STAs, one LTF of the second LTF effectively consists of or otherwise includes two LTFs (referred to as a third LTF) of the second LTF. In this case, two third LTFs are orthogonal to each other. There are several ways for two third LTFs to be orthogonal, including (1) split tones equally between two groups (e.g., odd tones and even tones (e.g., odd tones are assigned for 1, . . . , NSTS/2 space-time streams and even tones are assigned for NSTS/2+1, . . . , NSTS space-time streams) and (2) orthogonal mapping in frequency across pairs of neighboring tones by a distinct orthogonal code (e.g., a P matrix could be used and/or all streams are present on all tones of a 2× LTF. In this case, even though NSTS is supported up to 16, $T_{PE}$ could be set to 4 µs.

A second case is when HE+ STAs (no HE STAs) are to be combined in TB PPDUs. In this case, different HE+ NDPs (e.g., an EHT NDP or a beyond EHT NDP) could be allowed in an A-PPDU. Accordingly, depending on types of STAs combined in a TB PPDU for a sounding procedure, a beamformer sends a proper NDP (as shown in option 2 of FIG. 49 with HE+-SIG(s)) in an A-PPDU. When receiving an NDPA frame, an HE+ STA can expect the different NDP type in an A-PPDU, wherein the different NDPs meet the LTF end time alignment and the same number of HE+-SIG symbols with identifier information. The identifier information could indicate whether it is an NDP for EHT or an NDP for beyond EHT. The identifier information could indicate whether it is an NDP or not. In case one of the NDP PPDUs in an A-PPDU requires a longer $T_{PE}$, all NDP PPDUs support an 8 µs $T_{PE}$ to meet PPDU end time alignment.

Turning now to FIG. 51, a method 5100 will be described for communicating in a wireless network, in accordance with an example embodiment. The method 5100 may be performed by one or more devices or components described herein. Further, although described sequentially, the operations of the method 5100 can be performed in entirely or at least partially overlapping time periods. Accordingly, the configuration of the operations in FIG. 51 is for illustrative purposes.

As shown in FIG. 51, the method 5100 may commence at operation 5102 with a wireless device (e.g., the access point 104A) setting a type bit in a trigger frame to indicate a type of the trigger frame. In some embodiments, the type bit indicates whether the trigger frame is scheduling an uplink transmission for only a first set of stations in the wireless network or the first set of stations and a second set of stations in the wireless network. In some embodiments, the type bit is part of a high-efficiency signal-A2 reserved field of the trigger frame. Further, the high-efficiency signal-A2 reserved field includes nine bits and the type bit is the first bit of the nine bits of the high-efficiency signal-A2 reserved field. In some embodiments, the first set of stations are high-efficiency (HE) stations and the second set of stations are extremely high throughput (EHT) stations or beyond EHT stations (e.g., stations that comply with an IEEE standard that extends past EHT (i.e., IEEE 802.11be)). Alternatively, the first set of stations may be EHT or beyond EHT stations and the second set of stations are HE stations. In some embodiments, the type bit indicates whether the uplink transmission is scheduled for only a first type of stations (e.g., HE stations) or only a second type of stations (e.g., EHT stations).

In some embodiments, when the type bit is set to a value of zero, the trigger frame is scheduling an uplink transmission for the first set of stations and the second set of stations and when the type bit is set to a value of one, the trigger frame is scheduling an uplink transmission for only the first set of stations. Further, when the type bit is set to a value of zero, the first set of stations are allocated in a primary 160 MHz channel of a bandwidth of the uplink transmission and the second set of stations are allocated in a secondary 160 MHz channel of the bandwidth of the uplink transmission. In some embodiments, when the type bit is set to a value of one, the uplink transmission is scheduled for only a first type of stations (e.g., HE stations) in a primary 160 MHz channel of a bandwidth. In these embodiments, when the type bit is set to a value of zero, the uplink transmission is scheduled for only a second type of stations (e.g., EHT stations) in a primary and/or secondary 160 MHz channel of a bandwidth.

At operation 5104, the wireless device configures a common information field of the trigger frame. In one embodiment, the common information field is to be used by (1) all stations in the first set of stations for performing the uplink transmission and (2) when the type bit indicates that the trigger frame is scheduling the uplink transmission for the first set of stations and the second set of stations in the wireless network, all stations in the second set of stations for performing the uplink transmission.

At operation 5106, the wireless device configures a set of user information fields for the trigger frame. In some embodiments, the set of user information fields is to be used by (1) all stations in the first set of stations for performing the uplink transmission and (2) when the type bit indicates that the trigger frame is scheduling the uplink transmission for the first set of stations and the second set of stations in the wireless network, all stations in the second set of stations for performing the uplink transmission. In some embodiments, when the type bit is set to a value of zero, a user information field in the set of user information fields is designated for the second set of stations. Additionally, the user information field includes an association identifier field and the association identifier field is set to a value to indicate that the user information field is designated for extremely high throughput stations.

In one embodiment, the common information field includes an uplink bandwidth field that is composed of two bits and the set of user information fields includes a resource unit allocation field and a resource unit extension field, which indicates whether the primary 160 MHz channel or the secondary 160 MHz channel is allocated to a station. In some embodiments, the uplink bandwidth field, a first bit of the resource unit allocation field, and the resource unit extension field are collectively used to indicate the resource unit of the uplink transmission.

At operation 5108, the wireless device transmits the trigger frame to (1) all stations in the first set of stations when the type bit indicates that the trigger frame is scheduling the uplink transmission for the first set of stations and (2) all stations in the second set of stations when the type bit indicates that the trigger frame is scheduling the uplink transmission for the first set of stations and the second set of stations.

Turning now to FIG. 52, a method 5200 will be described for communicating in a wireless network, in accordance with an example embodiment. The method 5200 may be performed by one or more devices or components described herein. Further, although described sequentially, the operations of the method 5200 can be performed in entirely or at least partially overlapping time periods. Accordingly, the configuration of the operations in FIG. 52 is for illustrative purposes.

As shown in FIG. 52, the method 5200 may commence at operation 5202 with a wireless device (e.g., a non-AP station 104B) receiving, from an access point (e.g., the access point 104A), a trigger frame. In one embodiment, the trigger frame includes a type bit to indicate a type of the trigger frame and the type bit indicates whether the trigger frame is scheduling an uplink transmission for only a first set of stations in the wireless network or the first set of stations and a second set of stations in the wireless network. In some embodiments, the type bit is part of a high-efficiency signal-A2 reserved field of the trigger frame. Further, the high-efficiency signal-A2 reserved field includes nine bits and the type bit is the first bit of the nine bits of the high-efficiency signal-A2 reserved field. In some embodiments, the first set of stations are high-efficiency (HE) stations and the second set of stations are extremely high throughput (EHT) stations. In some embodiments, the first set of stations are high-efficiency (HE) stations and the second set of stations are extremely high throughput (EHT) stations or beyond EHT stations (e.g., stations that comply with an IEEE standard that extends past EHT (i.e., IEEE 802.11be)). Alternatively, the first set of stations may be EHT or beyond EHT stations and the second set of stations are HE stations. In some embodiments, the type bit indicates whether the uplink transmission is scheduled for only a first type of stations (e.g., HE stations) or only a second type of stations (e.g., EHT stations). In one embodiment, the wireless device/station is part of the first set of stations or the second set of stations.

In some embodiments, when the type bit is set to a value of zero, the trigger frame is scheduling an uplink transmission for the first set of stations and the second set of stations and when the type bit is set to a value of one, the trigger frame is scheduling an uplink transmission for only the first set of stations. Further, when the type bit is set to a value of zero, the first set of stations are allocated in a primary 160 MHz channel of a bandwidth of the uplink transmission and the second set of stations are allocation in a secondary 160 MHz channel of the bandwidth of the uplink transmission. In some embodiments, when the type bit is set to a value of one, the uplink transmission is scheduled for only a first type of stations (e.g., HE stations) in a primary 160 MHz channel of a bandwidth. In these embodiments, when the type bit is set to a value of zero, the uplink transmission is scheduled for only a second type of stations (e.g., EHT stations) in a primary and/or secondary 160 MHz channel of a bandwidth.

At operation 5204, the wireless device processes a common information field of the trigger frame. In some embodiments, the common information field is to be used by (1) all stations in the first set of stations for performing the uplink transmission and (2) when the type bit indicates that the trigger frame is scheduling the uplink transmission for the first set of stations and the second set of stations in the wireless network, all stations in the second set of stations for performing the uplink transmission.

At operation 5206, the wireless device processes a set of user information fields of the of the trigger frame. In some embodiments, the set of user information fields is to be used by (1) all stations in the first set of stations for performing the uplink transmission and (2) when the type bit indicates that the trigger frame is scheduling the uplink transmission for the first set of stations and the second set of stations in the wireless network, all stations in the second set of stations for performing the uplink transmission. In some embodiments, when the type bit is set to a value of zero, a user information field in the set of user information fields is designated for the second set of stations. Additionally, the user information field includes an association identifier field and the association identifier field is set to a value to indicate that the user information field is designated for extremely high throughput stations.

In one embodiment, the common information field includes an uplink bandwidth field that is composed of two bits and the set of user information fields includes a resource unit allocation field and a resource unit extension field, which indicates whether the primary 160 MHz channel or the secondary 160 MHz channel is allocated to a station. In some embodiments, the uplink bandwidth field, a first bit of the resource unit allocation field, and the resource unit extension field are collectively used to indicate the resource unit of the uplink transmission.

At operation 5208, the wireless device transmits a response to the trigger frame based on the common information field and the set of user information fields.

In some embodiments, when the type bit is set to a value of zero, a user information field in the set of user information fields is designated for the second set of stations. Additionally, the user information field includes an association identifier field and the association identifier field is set to a value to indicate that the user information field is designated for extremely high throughput stations Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for communicating in a wireless network, the method comprising:
    setting, by an access point, a type bit in a trigger frame to indicate a type of the trigger frame, wherein the type bit indicates whether the trigger frame is scheduling an uplink transmission for only a first set of stations in the wireless network or the first set of stations and a second set of stations in the wireless network;
    configuring, by the access point, a common information field of the trigger frame, wherein the common information field is to be used by (1) all stations in the first set of stations for performing the uplink transmission and (2) when the type bit indicates that the trigger frame is scheduling the uplink transmission for the first set of stations and the second set of stations in the wireless network, all stations in the second set of stations for performing the uplink transmission;
    configuring, by the access point, a set of user information fields of the trigger frame, wherein the set of user information fields is to be used by (1) all stations in the first set of stations for performing the uplink transmission and (2) when the type bit indicates that the trigger frame is scheduling the uplink transmission for the first set of stations and the second set of stations in the wireless network, all stations in the second set of stations for performing the uplink transmission; and
    transmitting, by the access point, the trigger frame to (1) all stations in the first set of stations when the type bit indicates that the trigger frame is scheduling the uplink transmission for the first set of stations and (2) all stations in the second set of stations when the type bit indicates that the trigger frame is scheduling the uplink transmission for the first set of stations and the second set of stations.

2. The method of claim 1, wherein the type bit is part of a high-efficiency signal-A2 reserved field of the trigger frame.

3. The method of claim 2, wherein the high-efficiency signal-A2 reserved field includes nine bits and the type bit is the first bit of the nine bits of the high-efficiency signal-A2 reserved field.

4. The method of claim 3, wherein first set of stations are high-efficiency stations and the second set of stations are extremely high throughput stations.

5. The method of claim 4, wherein when the type bit is set to a value of zero, the trigger frame is scheduling an uplink transmission for the first set of stations and the second set of stations; and
    wherein when the type bit is set to a value of one, the trigger frame is scheduling an uplink transmission for only the first set of stations.

6. The method of claim 5, wherein when the type bit is set to a value of zero, the first set of stations are allocated in a primary 160 MHz channel of a bandwidth of the uplink transmission and the second set of stations are allocated in a secondary 160 MHz channel of the bandwidth of the uplink transmission.

7. The method of claim 6, wherein when the type bit is set to a value of zero, a user information field in the set of user information fields is designated for the second set of stations.

8. The method of claim 7, wherein the user information field includes an association identifier field, and the association identifier field is set to a value to indicate that the user information field is designated for extremely high throughput stations.

9. The method of claim 8, wherein the common information field includes an uplink bandwidth field that is composed of two bits and the set of user information fields includes a resource unit allocation field, and a resource unit extension field, which indicates whether the primary 160 MHz channel or the secondary 160 MHz channel is allocated to a station.

10. The method of claim 9, wherein the uplink bandwidth field, a first bit of the resource unit allocation field, and the resource unit extension field are collectively used to indicate the resource unit of the uplink transmission.

11. A method for communicating in a wireless network, the method comprising:
    receiving, by a station from an access point, a trigger frame, wherein the trigger frame includes a type bit to indicate a type of the trigger frame, wherein the type bit indicates whether the trigger frame is scheduling an uplink transmission for only a first set of stations in the wireless network or the first set of stations and a second set of stations in the wireless network;
    processing, by the station, a common information field of the trigger frame, wherein the common information field is to be used by (1) all stations in the first set of stations for performing the uplink transmission and (2) when the type bit indicates that the trigger frame is scheduling the uplink transmission for the first set of stations and the second set of stations in the wireless network, all stations in the second set of stations for performing the uplink transmission;
    processing, by the station, a set of user information fields of the of the trigger frame, wherein the set of user information fields is to be used by (1) all stations in the first set of stations for performing the uplink transmission and (2) when the type bit indicates that the trigger frame is scheduling the uplink transmission for the first set of stations and the second set of stations in the wireless network, all stations in the second set of stations for performing the uplink transmission; and
    transmitting, by the station, a response to the trigger frame based on the common information field and the set of user information fields.

12. The method of claim 11, wherein the type bit is part of a high-efficiency signal-A2 reserved field of the trigger frame.

13. The method of claim 12, wherein the high-efficiency signal-A2 reserved field includes nine bits and the type bit is the first bit of the nine bits of the high-efficiency signal-A2 reserved field.

14. The method of claim 13, wherein first set of stations are high-efficiency stations and the second set of stations are extremely high throughput stations.

15. The method of claim 14, wherein when the type bit is set to a value of zero, the trigger frame is scheduling an uplink transmission for the first set of stations and the second set of stations; and wherein when the type bit is set to a value of one, the trigger frame is scheduling an uplink transmission for only the first set of stations.

16. The method of claim 15, wherein when the type bit is set to a value of zero, the first set of stations are allocated in a primary 160 MHz channel of a bandwidth of the uplink transmission and the second set of stations are allocated in a secondary 160 MHz channel of the bandwidth of the uplink transmission.

17. The method of claim 16, wherein the when the type bit is set to a value of zero, a user information field in the set of user information fields is designated for the second set of stations.

18. The method of claim 17, wherein the user information field includes an association identifier field, and the association identifier field is set to a value to indicate that the user information field is designated for extremely high throughput stations.

19. The method of claim 18, wherein the common information field includes an uplink bandwidth field that is composed of two bits, the set of user information fields includes a resource unit allocation field and a resource unit extension field, which indicates whether the primary 160 MHz channel or the secondary 160 MHz channel is allocated to a station.

20. The method of claim 19, wherein the uplink bandwidth field, a first bit of the resource unit allocation field, and the resource unit extension field are collectively used to indicate the resource unit of the uplink transmission.

* * * * *